(12) United States Patent
Nowakiewicz et al.

(10) Patent No.: US 11,275,731 B2
(45) Date of Patent: Mar. 15, 2022

(54) ACCELERATED FILTERING, GROUPING AND AGGREGATION IN A DATABASE SYSTEM

(71) Applicant: SingleStore, Inc., San Francisco, CA (US)

(72) Inventors: Michal Nowakiewicz, Redmond, WA (US); Eric Boutin, Bellevue, WA (US)

(73) Assignee: Singlestore, Inc., San Francisco, CA (US)

( * ) Notice: Subject to any disclaimer, the term of this patent is extended or adjusted under 35 U.S.C. 154(b) by 557 days.

(21) Appl. No.: 16/206,364

(22) Filed: Nov. 30, 2018

(65) Prior Publication Data

US 2019/0171634 A1 Jun. 6, 2019

Related U.S. Application Data

(60) Provisional application No. 62/593,767, filed on Dec. 1, 2017.

(51) Int. Cl.
*G06F 16/242* (2019.01)
*G06F 16/2453* (2019.01)
(Continued)

(52) U.S. Cl.
CPC .......... *G06F 16/244* (2019.01); *G06F 16/221* (2019.01); *G06F 16/2237* (2019.01); *G06F 16/2453* (2019.01); *G06F 16/2455* (2019.01)

(58) Field of Classification Search
None
See application file for complete search history.

(56) References Cited

U.S. PATENT DOCUMENTS

2010/0088315 A1* 4/2010 Netz .................... G06F 16/221
 707/737
2012/0173819 A1* 7/2012 Solihin ............... G06F 12/0806
 711/119

(Continued)

OTHER PUBLICATIONS

Abadi et al., "Column-Stores vs. Row-Stores: How Different Are They Really?" SIGMOD '08, Jun. 9-12, 2008, ACM, Vancouver, BC, Canada, XP055547043, DOI: 10.1145/1376616.1376712, ISBN: 978-1-60558-102-6.

(Continued)

*Primary Examiner* — Aleksandr Kerzhner
*Assistant Examiner* — Eddy Cheung
(74) *Attorney, Agent, or Firm* — EIP US LLP

(57) ABSTRACT

A method for causing a processor to perform a query on a column-store table of encoded values is provided. The method includes configuring the processor to receive the query, comprising a filter to be applied to at least a first column vector of the encoded values. The processor processes the query for the encoded values in the first column vector, to generate a first vector indicative of respective encoded values passing or failing the filter. The processor determines, from the first vector, an indicator of encoded values passing the filter and encoded values failing the filter, relative to the encoded values in the first column vector. The processor determines a bit length of the encoded values. The processor selects an algorithm for processing the query based on the indicator and the determined bit length of the encoded values. A system and a non-transitory, computer-readable medium are also provided.

24 Claims, 17 Drawing Sheets

(51) Int. Cl.
    *G06F 16/22*           (2019.01)
    *G06F 16/2455*       (2019.01)

(56) References Cited

U.S. PATENT DOCUMENTS

2014/0052713 A1* 2/2014 Schauer ............ G06F 16/24561
                                                                                  707/722
2016/0085781 A1* 3/2016 Ellison .................. G06F 9/3887
                                                                                  707/802

OTHER PUBLICATIONS

Abadi et al., "Integrating Compression and Execution in Column-Oriented Database Systems", SIGMOD 2006, Jun. 27-29, 2006, ACM, Chicago, Illinois, USA, XP055547523, DOI: 10.1145/1142473.1142548, ISBN: 978-1-59593-434-5.
International Search Report and Written Opinion dated May 6, 2019 for PCT International Application No. PCT/US2018/063357.

* cited by examiner

ACCELERATED FILTERING, GROUPING AND AGGREGATION IN A DATABASE SYSTEM

CROSS-REFERENCE TO RELATED APPLICATIONS

This application claims the benefit of U.S. Provisional Application No. 62/593,767, filed Dec. 1, 2017, under 35 U.S.C. § 119(a), the entire contents of which is incorporated by reference in its entirety.

FIELD OF THE DISCLOSURE

The present application relates to database searching and, more specifically, methods and systems for increasing the efficiency of search queries in database systems.

BACKGROUND

As technologies advance, the amount of information stored in electronic form and the desire for real-time or pseudo real-time ability to search such information is ever increasing. Database management systems are designed to organize data in a form that facilitates efficient search and retrieval of select information. Typical database management systems allow a user to submit a "query" in a query language for retrieving information that satisfies particular search parameters.

In known database management systems, a particular query may be processed against data within a database, utilizing a static algorithm or process that is based on the query, without regard for particular features of the query. Because the data against which the query is processed may be extremely large, e.g., hundreds of millions or billions of individual entries, such a static algorithm or process typically takes one or more orders of magnitude more clock cycles than there are individual entries to return a result to the query, making query response time unacceptably large. Accordingly, it would be advantageous to reduce the time required to return results of user queries against database management systems.

SUMMARY

One aspect provides a method for causing a processor to perform a query on a column-store table of encoded values. The method includes configuring the processor to receive the query, the query comprising a filter to be applied to at least a first column vector of the encoded values. The method includes configuring the processor to process the query for each of the encoded values in the first column vector, whereby to generate a first vector indicative of respective encoded values passing the filter or failing the filter. The method includes configuring the processor to determine, from the first vector, an indicator of encoded values passing the filter and encoded values failing the filter, relative to the encoded values in the first column vector. The method includes configuring the processor to determine a bit length of the encoded values in the first column vector. The method includes configuring the processor to, for at least a subset of the encoded values in the first column vector, select an algorithm from a plurality of algorithms for processing the query based on the indicator and the determined bit length of the encoded values.

Another aspect provides a non-transitory, computer readable medium comprising code that, when executed, causes a processor to receive the query, the query comprising a filter to be applied to at least a first column vector of the encoded values. The code, when executed, causes the processor to process the query for each of the encoded values in the first column vector, whereby to generate a first vector indicative of respective encoded values passing the filter or failing the filter. The code, when executed, causes the processor to determine, from the first vector, an indicator of encoded values passing the filter and encoded values failing the filter, relative to the encoded values in the first column vector. The code, when executed, causes the processor to determine a bit length of the encoded values in the first column vector. The code, when executed, causes the processor to for at least a subset of the encoded values in the first column vector, select an algorithm from a plurality of algorithms for processing the query based on the indicator and the determined bit length of the encoded values.

Another aspect provides a system configured to perform a query on a column-store table of encoded values. The system includes at least one register configured to hold one or more values. The system includes at least one processor. The system includes a computer readable medium comprising code that, when executed, causes the processor to receive the query, the query comprising a filter to be applied to at least a first column vector of the encoded values. The code, when executed, causes the processor to process the query for each of the encoded values in the first column vector, whereby to generate a first vector indicative of respective encoded values passing the filter or failing the filter. The code, when executed, causes the processor to determine, from the first vector, an indicator of encoded values passing the filter and encoded values failing the filter, relative to the encoded values in the first column vector. The code, when executed, causes the processor to determine a bit length of the encoded values in the first column vector. The code, when executed, causes the processor to, for at least a subset of the encoded values in the first column vector, select an algorithm from a plurality of algorithms for processing the query based on the indicator and the determined bit length of the encoded values.

DETAILED DESCRIPTION

In the following description, for purposes of explanation rather than limitation, specific details are set forth such as the particular architecture, interfaces, techniques, etc., in order to provide a thorough understanding of the concepts described herein. However, it will be apparent to those skilled in the art that the other embodiments may be practiced, which depart from these specific details. Similarly, the present application is directed to example embodiments as illustrated in the FIGs., and is not intended as limiting beyond the terms expressly included in the claims. For purposes of simplicity and clarity, detailed descriptions of well-known devices and methods are omitted so as not to obscure the description with unnecessary detail. However, the lack of any description for any particular device or method does not necessarily indicate that it or its function are well-known.

The FIGs. describe example query processing systems using the paradigm of a database query system that processes queries formed using the operations and format of the standard Structured Query Language (SQL). One of skill in the art will recognize, however, that the principles described herein may be applied for the processing of queries in other programming and query languages as well.

Figure 1:
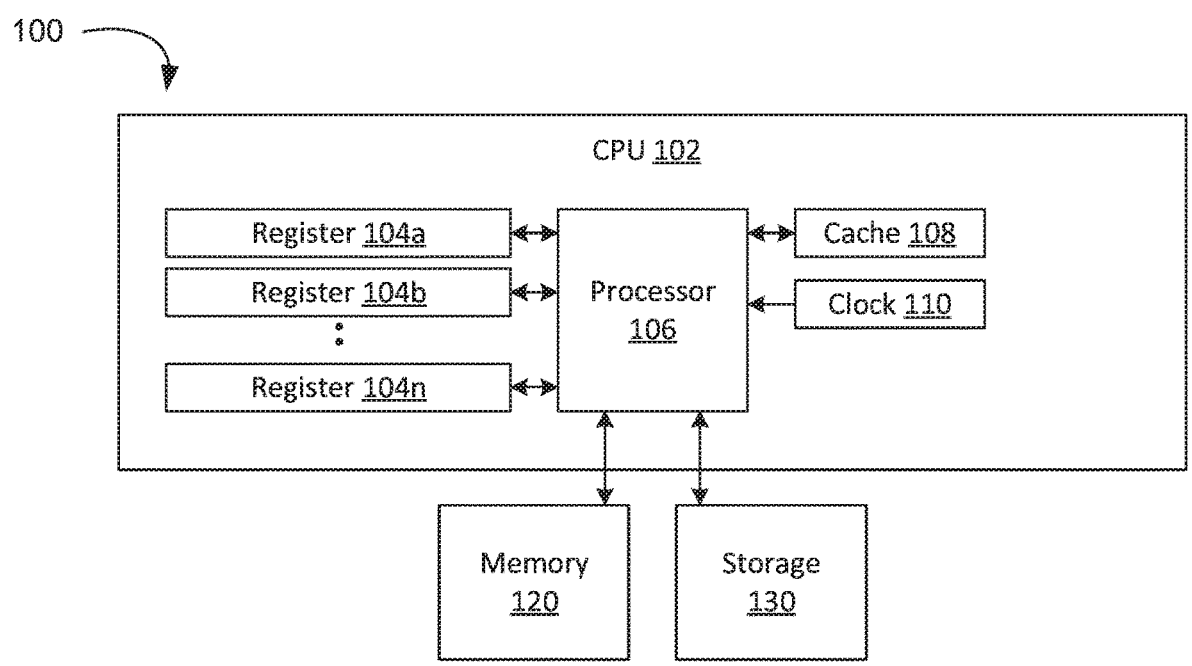
FIG. 1 is a block diagram illustrating a system for executing a query made against a collection of data, in accordance with some embodiments.

FIG. 1 is a block diagram illustrating a system 100 for executing a query made against a collection of data, in accordance with some embodiments. System 100 includes a central processing unit (CPU) 102, memory 120, and storage 130. CPU 102 includes a processor 106, at least one cache 108, a clock 110 and a plurality of registers 104a, 104b . . . 104n (104a-104n). In some embodiments, one or more registers, including registers 104a-104n, described herein may be single instruction multiple data (SIMD) registers. However, the present disclosure contemplates the use of any type of data register having capacities of any number of bits.

Each of registers 104a-104n may be configured to hold data received from one another and/or from one or more of processor 106, cache 108, memory 120, or storage 130. Each of registers 104a-104n may be a 256-bit register, configured to store up to 256 bits of data on which one or more operations are simultaneously conducted by, e.g., processor 106. However, registers 104a-104n are not so limited and may have any other number of bits and/or may be any other type of register.

Processor 106 is configured to perform one or more operations or instructions for processing a query on data held in at least one of registers 104a-104n, ultimately retrieved from one or more of cache 108, memory 120 or storage 130, or data while held in one or more of cache 108, memory 120 or storage 130. In some embodiments, such instructions may be single input multiple data (SIMD) instructions compatible with advanced vector extensions (AVX) such as AVX2, which expands most integer commands to 256 bits, AVX512, which expands most integer commands to 512 bits, or any other extension of integer commands to any number of bits.

Clock 110 is configured to provide a train of clock signals for timing, controlling, and conducting computer operations within system 100.

Cache 108 may comprise a data store located physically closer to processor 106 than either memory 120 or storage 130. In some embodiments, cache 108 may have a smaller storage capacity than either memory 120 or storage 130, but particular data may be read from or written to cache 108 in a shorter period of time than that particular data could otherwise be read from or written to either memory 120 or storage 130.

Memory 120 may comprise a data store separate from cache 108 and storage 130, such as random-access memory (RAM), from which data stored thereon may be accessed. In some embodiments, memory 120 may have a greater storage capacity than cache 108 and a smaller storage capacity than storage 130. In some embodiments, particular data may be read from or written to memory 120 in a shorter period of time than that particular data could otherwise be read from or written to storage 130, but may take a longer period of time to read from or write to than that particular data could otherwise be read from or written to cache 108.

Storage 130 may comprise a data store separate from cache 108 and memory 120, such as a hard drive or database server, from which data stored thereon may be accessed. In some embodiments, storage 130 may have a greater storage capacity than either cache 108 or memory 120, however, particular data may take a longer period of time to read from or write to storage 130 than that particular data could otherwise be read from or written to either cache 108 or memory 120.

Although CPU 102 is illustrated as having one processor 106, cache 108, clock 110 and set of registers 104a-104n, the present disclosure is not so limited, and a plurality of such features may be present in each of one or more CPUs, e.g., providing one or more multi-core processors for system 100. Moreover, any discussion of operations performed by processor 106 may indicate operations performed by a single processor 106, or operations performed by different processors of a plurality of similar processors.

Figure 2:
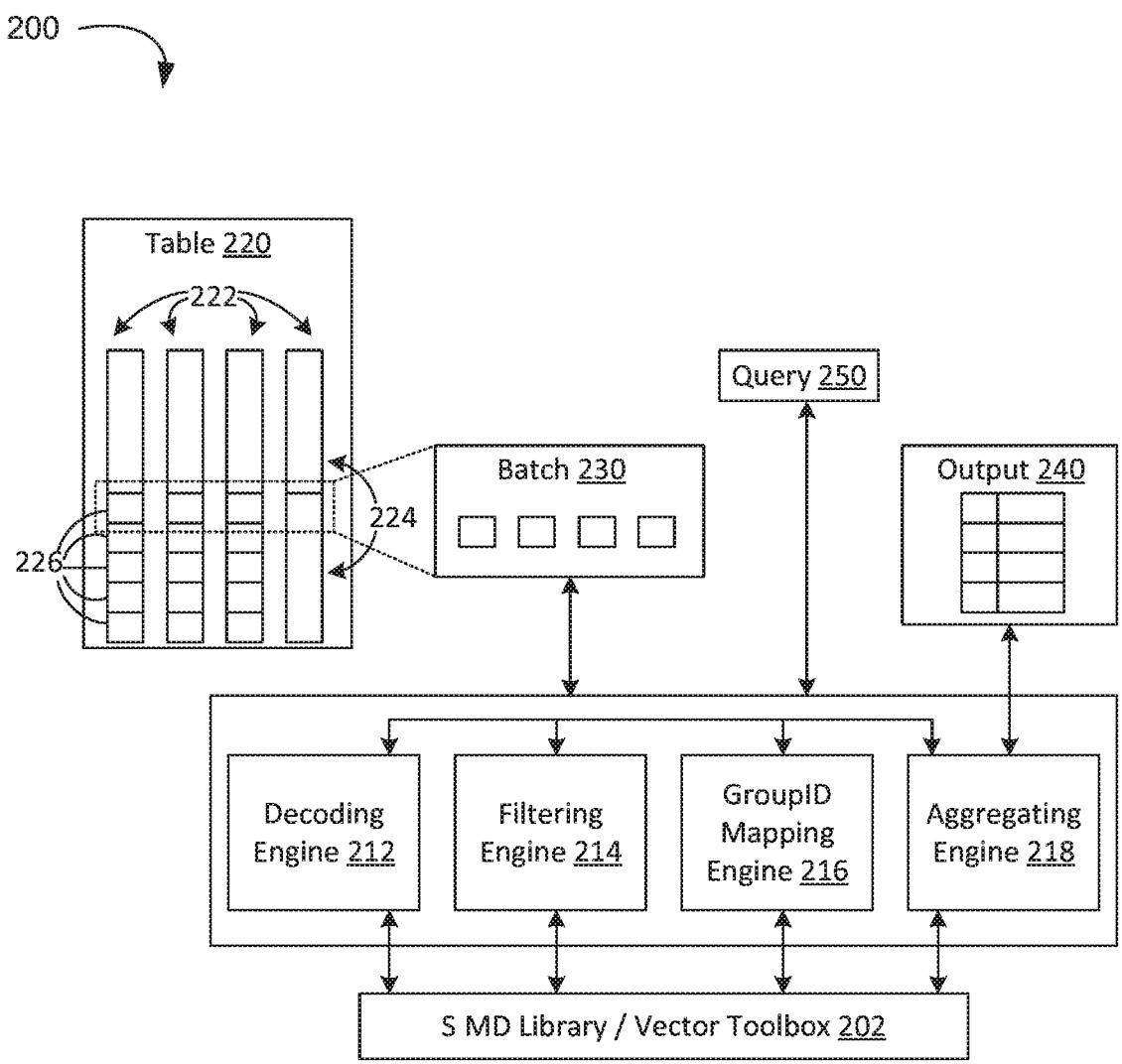
FIG. 2 is a block diagram illustrating including several modules or engines, which may be incorporated into the system of FIG. 1, in accordance with some embodiments.

FIG. 2 is a block diagram illustrating 200 including several modules or engines, which may be incorporated into system 100 of FIG. 1, in accordance with some embodiments.

Diagram 200 includes a decoding engine 212 configured to decode one or more items of encoded data. Diagram 200 further includes a filtering engine 214 configured to filter one or more sets of data according to a set of filter parameters defined by a query 250. Diagram 200 further includes a groupID mapping engine 216 configured to map one or more group IDs from one or more sets of data that are to be to be grouped according to the set of parameters defined by query 250. Diagram 200 further includes an aggregating engine 218 configured to aggregate one or more data values to provide a resulting output 240 based on the set of parameters defined by query 250. In some embodiments, one or more of decoding engine 212, filtering engine 214, groupID mapping engine 216, and aggregating engine 218 may be embodied by at least a portion of processor 106 (see FIG. 1) and/or another processor similar to processor 106 of system 100.

In some embodiments, a table 220 comprises data against which query 250 may be performed. Table 220 may comprise encoded data stored in a column-store format. For example, in column-store format, each of one or more columns 222 of encoded data hold values for a particular field and are stored in a corresponding location in memory, e.g., in memory 120 and/or storage 130 (see FIG. 1). In some embodiments, columns 222 may each comprise billions of rows of encoded data, or more. Accordingly, each column 222 may be divided into a plurality of contiguous segments 224 of, e.g., 1 million (M) rows of encoded data. Each segment 224 of a given column 222 may be encoded separately from each other segment 224 of another column 222, utilizing encoding techniques such as dictionary encoding, run length encoding, or integer value encoding, though other encoding techniques are also contemplated.

Dictionary encoding comprises mapping instances of identical recurring bits within raw data to corresponding integers within a corresponding dictionary, and then replacing the recurring bits with the corresponding integers, thereby decreasing the number of bits required to describe the raw data. A dictionary may be taken to mean a collection of objects that maps in one or both directions between raw data values and integer serial numbers for those values. An example unencoded table is shown in Table 1 below.

TABLE 1 table_of_sales

| division | State | sale_amt |
|---|---|---|
| east | New York | 1,000 |
| west | California | 2,000 |
| east | Florida | 2,000 |
| east | New York | 3,000 |
| west | Washington | 2,000 |
| west | Nevada | 1,000 |
| east | New York | 4,000 |
| east | Florida | 2,000 |

Since each segment 224 of each column 222 ("division", "state", "sale_amt") may be encoded utilizing its own dictionary of values, Table 2 shows an example dictionary for the "division" column, Table 3 shows an example dictionary for the "state" column, and Table 4 shows an example dictionary for the "sale_amt" column.

TABLE 2

| Encoded Value | Raw Value |
|---|---|
| 0 | east |
| 1 | west |

TABLE 3

| Encoded Value | Raw Value |
|---|---|
| 000 | New York |
| 001 | California |

TABLE 3-continued

| Encoded Value | Raw Value |
|---|---|
| 010 | Florida |
| 011 | Washington |
| 100 | Nevada |

TABLE 4

| Encoded Value | Raw Value |
|---|---|
| 00 | 1,000 |
| 01 | 2,000 |
| 10 | 3,000 |
| 11 | 4,000 |

The dictionary of Table 1 has two different raw values (east/west) and so encoding may be accomplished using 1 bit. The dictionary of Table 2 has 5 different raw values (New York/California/Florida/Washington/Nevada) and so encoding may be accomplished using 3 bits. The dictionary of Table 3 has 4 raw values (1,000/2,000/3,000/4,000) and so encoding may be accomplished using 2 bits. Accordingly, using the dictionaries of Tables 2-4, the data shown in Table 1 may be dictionary encoded as shown in Table 5. Such Dictionary encoding may be utilized for any data type, e.g. integer, string, etc.

TABLE 5 table_of_sales

| division | state | sale_amt |
|---|---|---|
| 0 | 000 | 00 |
| 1 | 001 | 01 |
| 0 | 010 | 01 |
| 0 | 000 | 10 |
| 1 | 011 | 01 |
| 1 | 100 | 00 |
| 0 | 000 | 11 |
| 0 | 010 | 01 |

Run length encoding comprises indicating a plurality of repeating values by indicating the smallest unit of the repeating digits followed by an integer number indicating the number of times the smallest unit is consecutively repeated. For example, WWWWWWWWWWWWBBBBBBBBBBBB would be encoded as W12B12, reducing 24 characters to 6 Similarly, WWBWWBWWBWWB would be encoded as WWB4, reducing 12 characters to 4. Although this example of run length encoding is shown utilizing ASCII characters, such data may also, typically, ultimately be stored in binary form.

For purposes of the present disclosure, queries 250 performed against encoded data in table 220 are performed by evaluating the encoded data in segments 224 of columns 222 of table 220 in batches 230. For example, batch 230 may comprises a moving window of a fixed number of rows, e.g. up to 4096 rows, of each column 222. Each batch is processed entirely before advancing to the next batch of rows and previously processed batches are not revisited during processing of the same query or subquery.

Accordingly, one or more of decoding engine 212, filtering engine 214, groupID mapping engine 216, and aggregating engine 218 may process each batch 230 sequentially according to the parameters of the particular query or subquery 250. In some embodiments, such processing may include loading encoded data from each batch 230 into registers 104a-104n and processing that data at least in part as described below in connection with any of the figures herein. However, any operation described herein having data of any type loaded and/or manipulated in a register may alternatively operate on the data while stored in an array or other type of data structure, such as cache 108, memory 120 or storage 130.

In performing such processing, one or more of decoding engine 212, filtering engine 214, groupID mapping engine 216, and aggregating engine 218 may utilize a set of functions, e.g. C programming language functions within vector toolbox 202, configured to simultaneously carry out particular operations on all data held in one or more column vectors, associated dictionaries, and aggregation dictionaries at a particular time. In some embodiments, portions of data in one or more column vectors may optionally be stored and manipulated in registers, such as registers 104a-104n (FIG. 1). In some embodiments, such functions may include selection functions, which gather values according to parameters of query or subquery 250 while preserving their encoding, as will be described below. Such functions may further include concatenation functions, which may concatenate data from more than one column of table 220, as will be described below. Such concatenation may, in some cases, combine data encoded utilizing different encoding schemes, e.g. RLE and dictionary encoding. Such functions may further include aggregation functions, which may include grouping data based on one or more parameters of query or subquery 250 and/or performing an operation that requires aggregating multiple values, e.g. determining a count, sum, average, minimum, maximum, standard deviation, median, mode, etc., of items passing a particular filter and belonging to a particular group, as will be described below. Such functions may further include dictionary encoding and decoding functions, e.g. generating and utilizing dictionaries.

Figure 3:
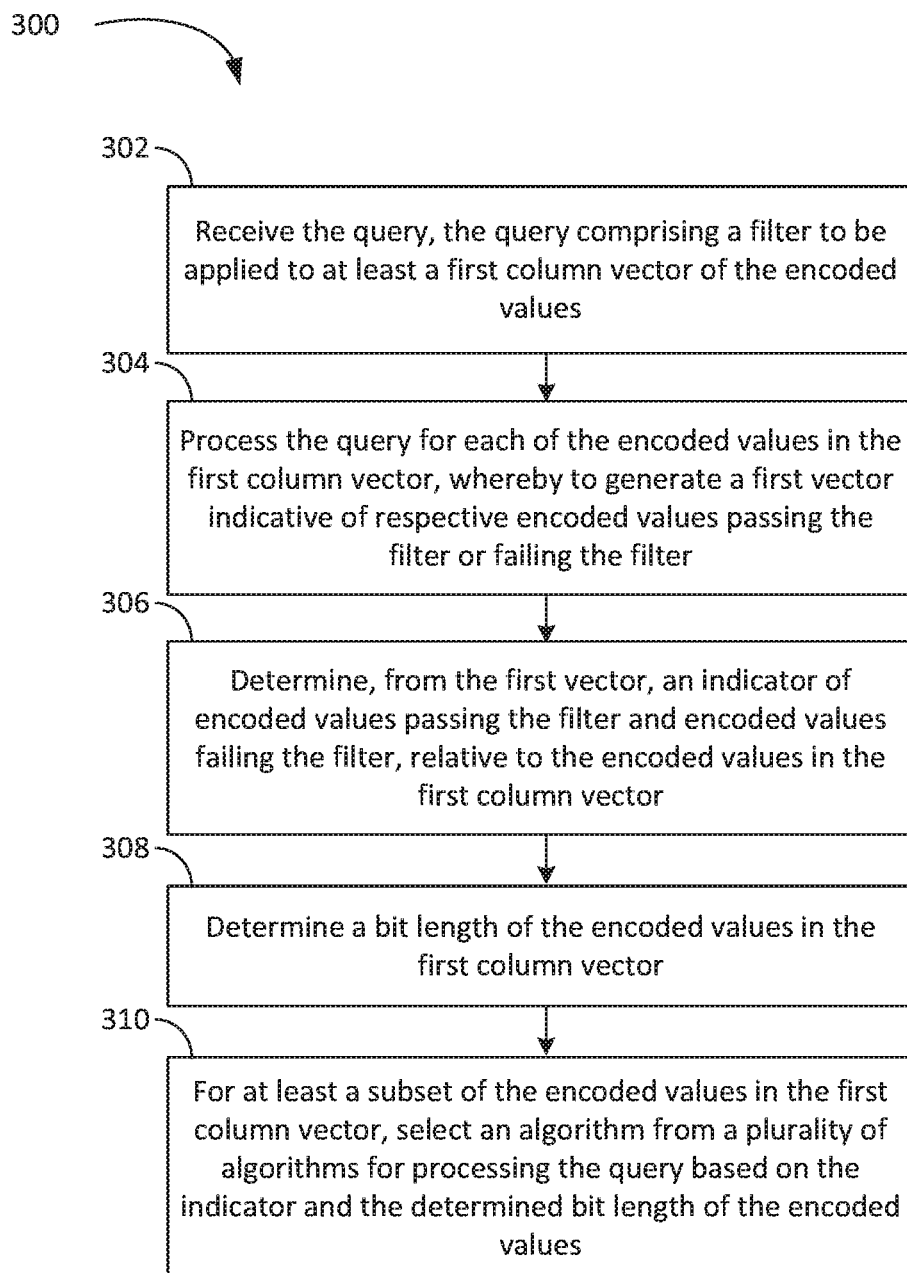
FIG. 3 illustrates a flowchart of a process for performing a query on a table of encoded values, in accordance with some embodiments.

FIG. 3 illustrates a flowchart 300 of a process for performing a query 250 on a table 220 of encoded values, in accordance with some embodiments. Although certain steps or actions are described in connection with FIG. 3, a process for performing a query 250 on a table 220 of encoded values may include fewer than all steps described, and/or additional or alternative steps to those described.

In some embodiments, flowchart 300 may be utilized to process a query or subquery 250 that includes both a selection, e.g., selecting a subset of values in one or more columns 222 of table 220 based on one or more parameters of the query or subquery 250, and a grouping and aggregation of the subset of values identified by the selection, e.g. sorting and performing an aggregating operation such as sum, minimum, maximum, average, standard deviation, median, mode, etc., on the selected subset of values based on one or more parameters of the query or subquery 250.

Block 302 includes receiving a query, the query including a filter to be applied to at least a first column vector of encoded values. For example, processor 106 (FIG. 1) may receive query 250 (FIG. 2). Query 250 may include a filter to be applied to at least one column vector of encoded values of columns 222 of table 220. A non-limiting example of such a query is shown below:

Select state, sum(sale_amt)
   From table_of_sales
   Where division='east'
   Group by state This example query selects entries from the table "table_of_sales" where the division is "east" and indicates the output result should be the sum of "sale_amt" for each "state", grouped by "state". Thus, in such an example query where division='east' would be the filter or selection, sum (sale_amt) would be the aggregation (a sum), and Group by state would be the indication of how the result should be grouped, or sorted.

Block 304 includes processing the query for each of the encoded values in the first column vector, whereby to generate a first vector indicative of respective encoded values passing the filter or failing the filter. For example, processor 106 (FIG. 1) may be configured to generate a first vector (alternatively described herein as a selection byte vector) that indicates whether each row in batch 230 satisfies the filter parameters via a first value (e.g. 0x00 or all bits not set), or does not satisfy the filter parameters via a second value (e.g. 0xFF or all bits set). Such a selection byte vector may have entries with a length of 1 byte (8 bits), consistent with how AVX2 comparison instructions store the output for single byte elements. Since encoded data of table 220 is processed in batches 230, such a selection byte vector may have a number of rows equal to a number of rows of table 220 processed in batch 230 (e.g. 4096 rows). A non-limiting example of a portion of such a selection byte vector is shown in Table 6 below, corresponding to the portion of table_of_sales of Table 5 and utilizing the example dictionary encoding previously described in connection with Tables 2-4 for the query shown in the preceding paragraphs:

TABLE 6

| |
| --- |
| 0x00 |
| 0xFF |
| 0xFF |
| 0x00 |
| 0x00 |
| 0xFF |
| 0xFF |

Block 306 includes determining, from the first vector, an indicator of encoded values passing the filter and encoded values failing the filter, relative to the encoded values in the first column vector. For example, processor 106 (FIG. 1) may be configured to determine, from the first vector, an indicator of encoded values passing the filter and encoded values failing the filter, relative to the encoded values in the first column vector. Such an indicator may indicate a selectivity of the filter defined by the parameters of query 250 on the portion of table 220 included in the current batch 230. Using Table 6 as an example, such an indicator of selectivity may indicate that the filter passed 5 of the 8 rows, corresponding to a selectivity of 62.5% or 0.625. In this example, the filter or selection eliminated 3 of 8 rows. However, depending on the parameters of the particular filter used, selectivity may range from 0% (0.000) to 100% (1.000), inclusive.

Block 308 includes determining a bit length of the encoded values in the first column vector. For example, processor 106 (see FIG. 1) may be configured to determine a bit length of the encoded values in the column vector being evaluated, e.g., for the example query indicated above, the column vector for sale_amt of Table 5 having a bit length of 2 bits.

Block 310 includes, for a subset of the encoded values in the first column vector, selecting an algorithm from a plurality of algorithms for processing the query based on the indicator and the determined bit length of the encoded values. For example, several processes or algorithms are described below for carrying out the selection, grouping, and/or aggregation of encoded values to generate output 240 (see FIG. 2). However, some of these processes or algorithms are more efficient than others, in terms of clock cycles required to perform query 250, depending on the selectivity of the filter defined by query 250 and the bit lengths of encoded values. For example, as will be described below, between selection by compacting, gather selection and selection by special group assignment, at a selectivity of 62.5% and a bit width of 2 bits, some embodiments may choose selection by compacting as the preferred selection process.

Selection by Compacting

The vector operation of compacting takes two inputs: the selection byte vector (first vector) previously described in connection with block 304 of FIG. 3, and an input column vector with arbitrary numeric elements from which an output column vector may be generated. Element size for the input column vector may be any of 1 byte, 2 bytes, 4 bytes, or 8 bytes. The result of compacting is an output column vector having all entries of the input column vector indicated by the selection byte vector to have been passed (e.g. having a corresponding row entry of 0xFF) by the filter defined by query 250. A description of selection by compacting follows with reference to FIG. 4, which illustrates a process for performing selection by compacting for a query 250, in accordance with some embodiments, and FIG. 5, which is a block diagram illustrating certain data vectors, registers, and operations described by FIG. 4.

Figure 4:
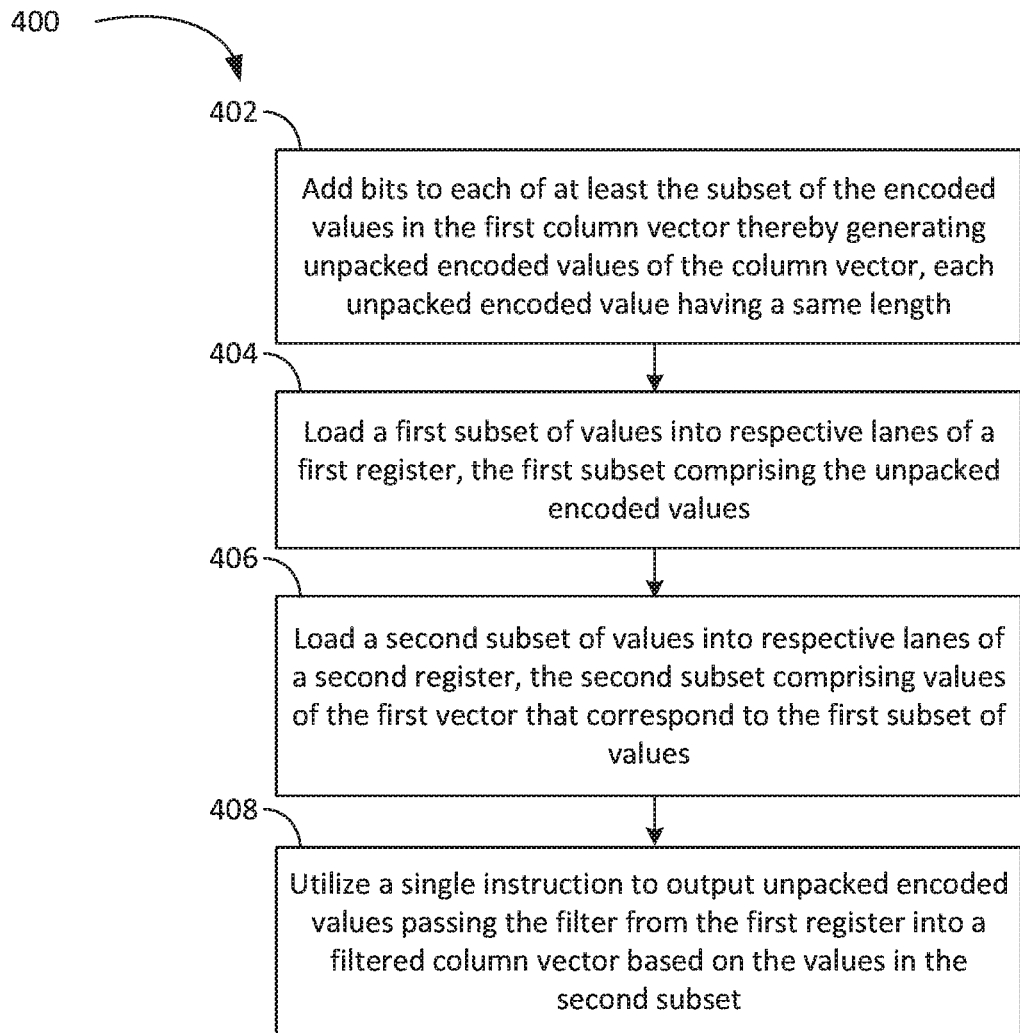
FIG. 4, illustrates a process for performing selection by compacting for a query, in accordance with some embodiments.

Although certain steps or actions are described in connection with FIG. 4, a process for performing selection by compacting for query 250 may include fewer than all steps described, and/or additional or alternative steps to those described.

Block 402 includes adding bits to each of at least the subset of the encoded values in the first column vector thereby generating unpacked encoded values of the first column vector, each unpacked encoded value having a same length. The same length may be one byte, two bytes, four bytes or eight bytes. For example, with reference to FIG. 5, encoded values of a given first column vector 512 are not necessarily encoded in whole-byte lengths. Thus, to ensure maximum usage of registers 104a-104n (see FIG. 1) and to ensure encoded values of first column vector 512 each fit completely within a given register 104a, processor 106 (FIG. 1) may unpack encoded values of first column vector 512 to the next largest size of 1 byte, 2 bytes, 4 bytes, or 8 bytes, utilizing an unpacking operation 514, to generate a corresponding first column vector 516 of unpacked encoded values. $2^n$ byte sizes, where n=0, 1, 2 or 3, provides such assurances.

Figure 5:
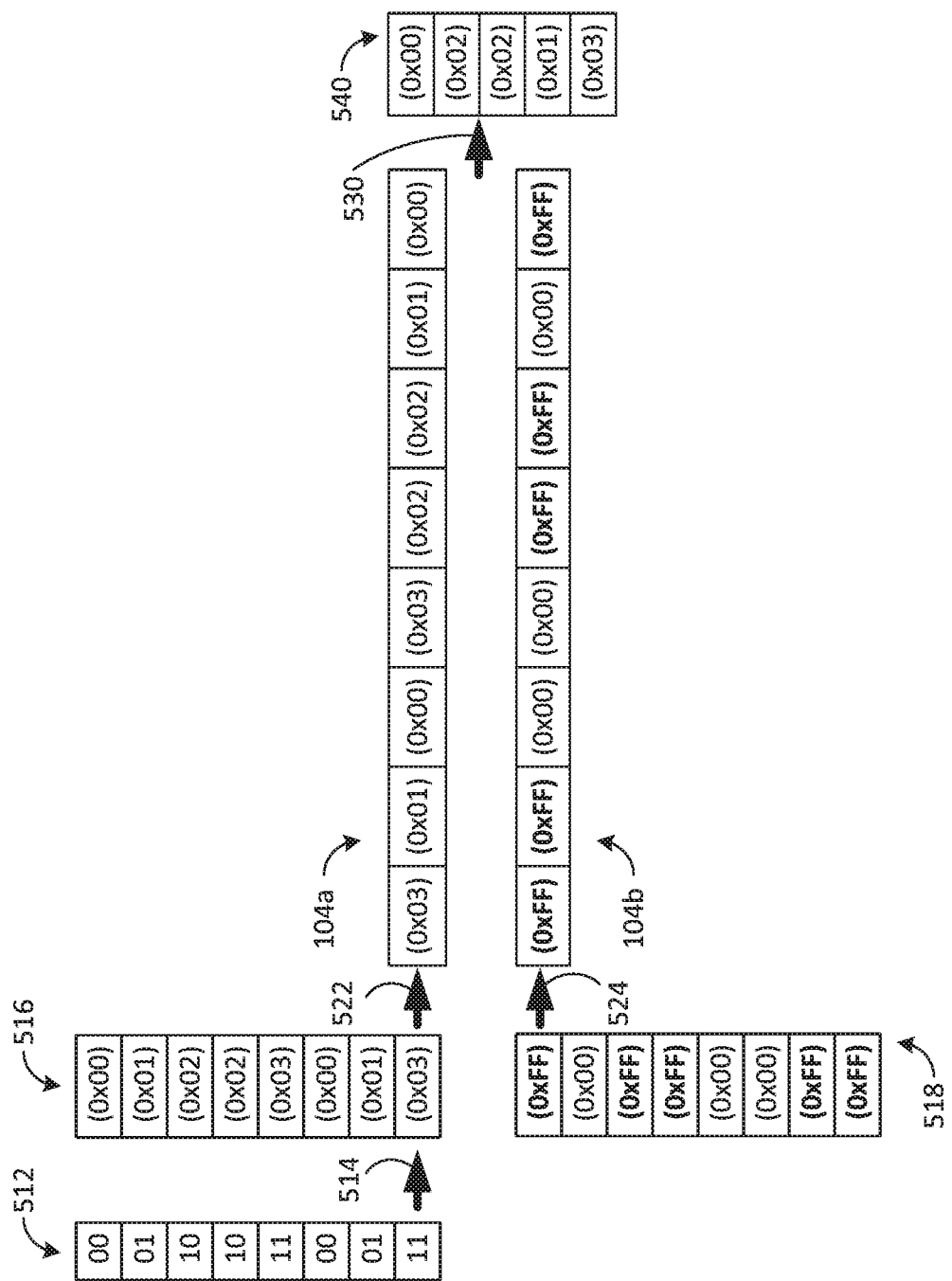
FIG. 5 is a block diagram illustrating certain data vectors, registers, and operations described by FIG. 4.

Block 404 includes loading a first subset of values into respective lanes of a first register, the first subset comprising the unpacked encoded values. For example, with reference to FIG. 5, processor 106 (FIG. 1) may load a first subset of unpacked encoded values from unpacked first column vector 516, now having whole-byte lengths, into respective lanes of register 104a utilizing a load operation 522. In FIG. 5, lanes are indicated by individual boxes, having 1 byte length, although lanes may be any length based on the data being loaded.

Block 406 includes loading a second subset of values into respective lanes of a second register, the second subset comprising values of the first vector that correspond to the first subset of values. For example, with reference to FIG. 5, processor 106 (FIG. 1) may perform a loading operation 524 to load a second subset of values of selection byte vector 518 (first vector) into respective lanes of register 104b. The second subset of values 518 correspond to the first subset of values of unpacked first column vector 516 and are loaded into register 104b. Since the values of selection byte vector 518 (first vector) each have a length of 1 byte, a whole number of unpacked encoded values may be loaded into register 104b. Since the second subset of values of the selection byte vector loaded into register 104b correspond to the first subset of unpacked encoded values loaded into register 104a, a same number of values of second byte vector 518 are loaded into register 104b as unpacked encoded values are loaded into register 104a, and in the same order.

Block 408 includes utilizing a single instruction to output unpacked encoded values passing the filter from the first register into a filtered first column vector based on the values in the second subset. For example, with reference to FIG. 5, processor 106 (FIG. 1) may utilize a single instruction, outputting operation 530, to output unpacked encoded values passing the filter from register 104a into a filtered first column vector 540 based on the values of the selection byte vector 518 (first vector) loaded into register 104b. In some embodiments, such an operation may be an AND operation between corresponding lanes of registers 104a and 104b (e.g., between unpacked encoded values from unpacked first column vector 516 loaded into register 104a and corresponding values from selection byte vector 518 (first vector) loaded into register 104b).

Gather Selection

The vector operation of gather selection utilizes some steps previously described for the selection by compacting process, while introducing additional and/or alternative steps. A description of gather selection follows with reference to FIG. 6, which illustrates a process for performing gather selection for a query 250, in accordance with some embodiments, and FIGS. 7A and 7B, which illustrate block diagrams of certain data vectors, registers, and operations described by FIG. 6.

Figure 6:
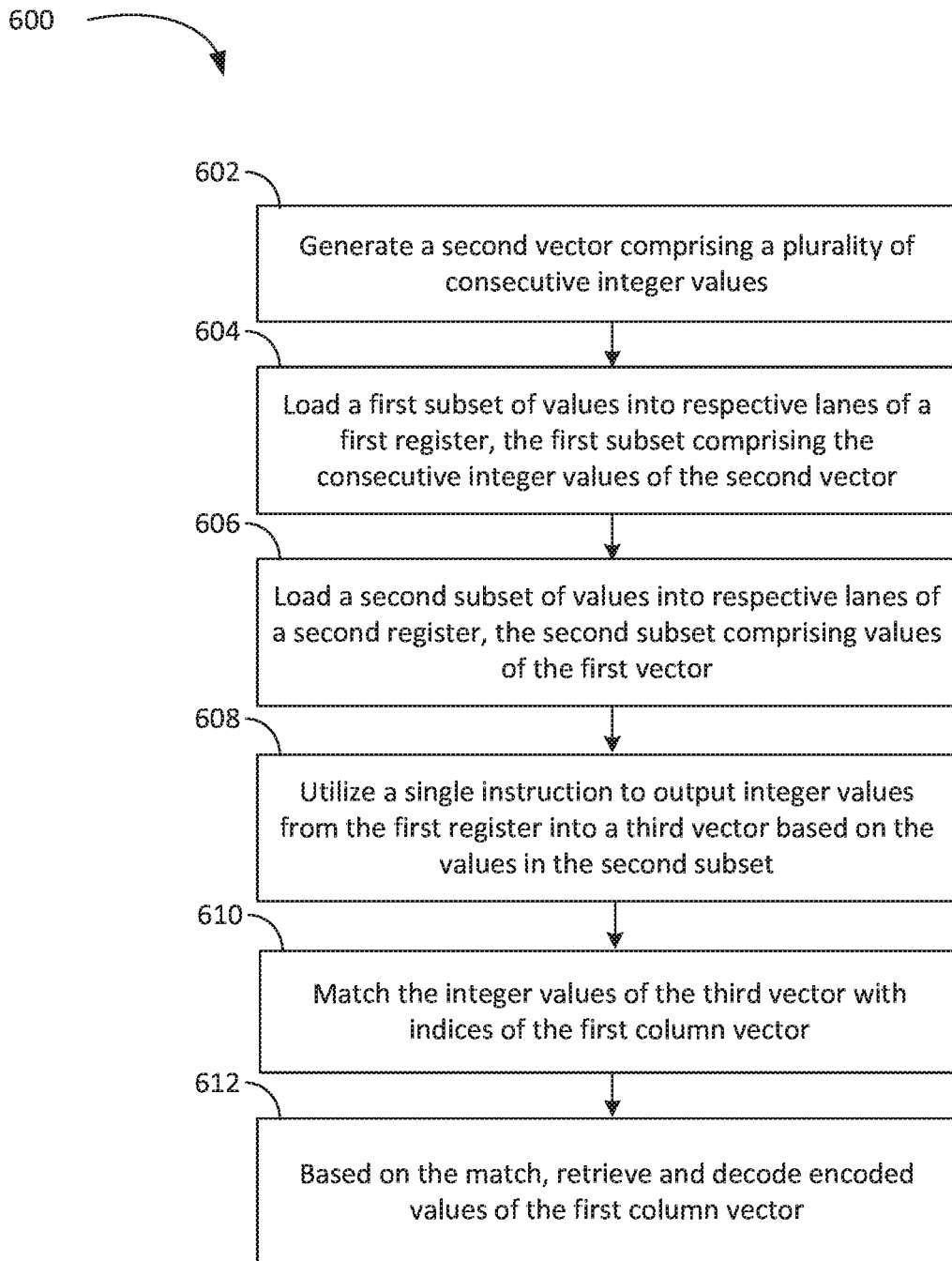
FIG. 6 illustrates a process for performing gather selection for a query, in accordance with some embodiments.
Figure 7A:
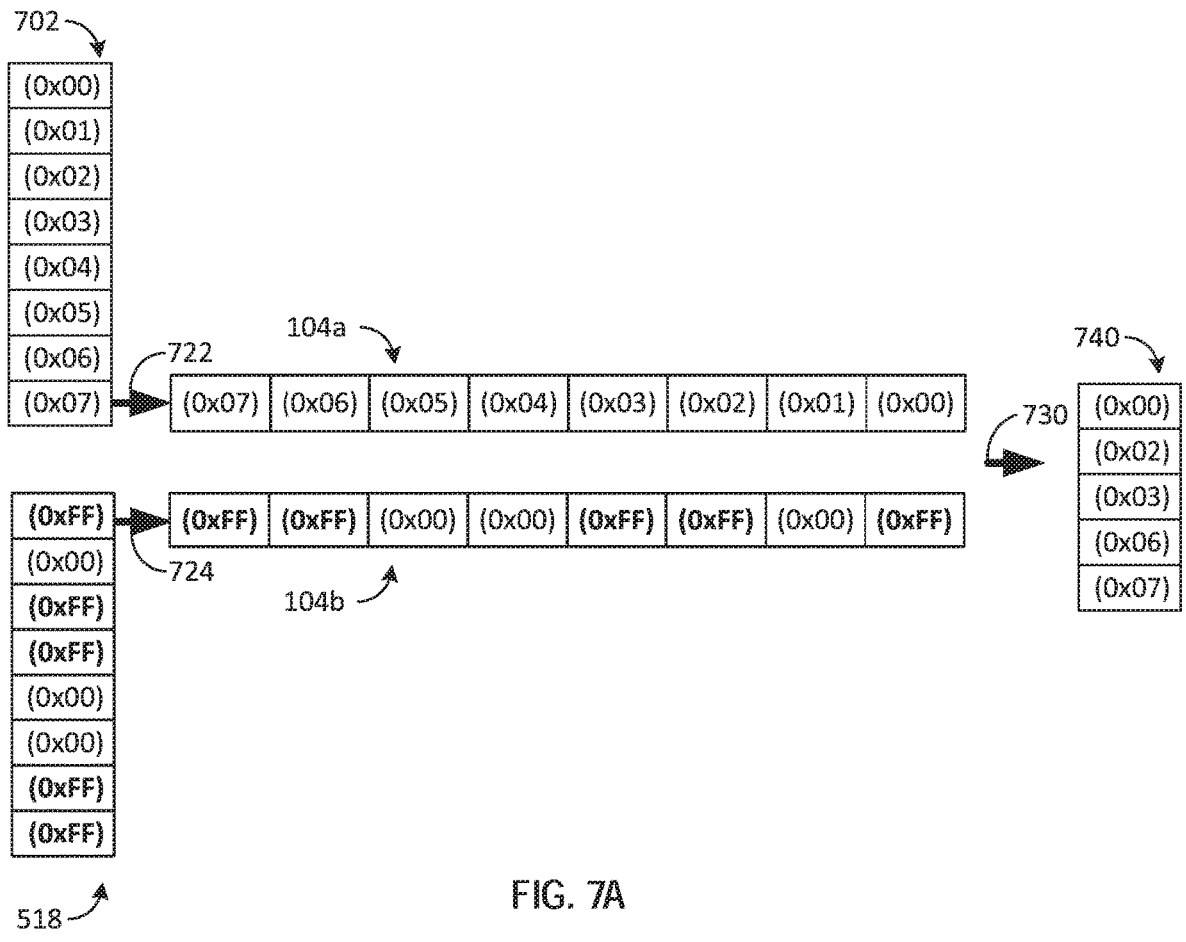
FIGS. 7A and 7B illustrate block diagrams of certain data vectors, registers, and operations described by FIG. 6.
Figure 7B:
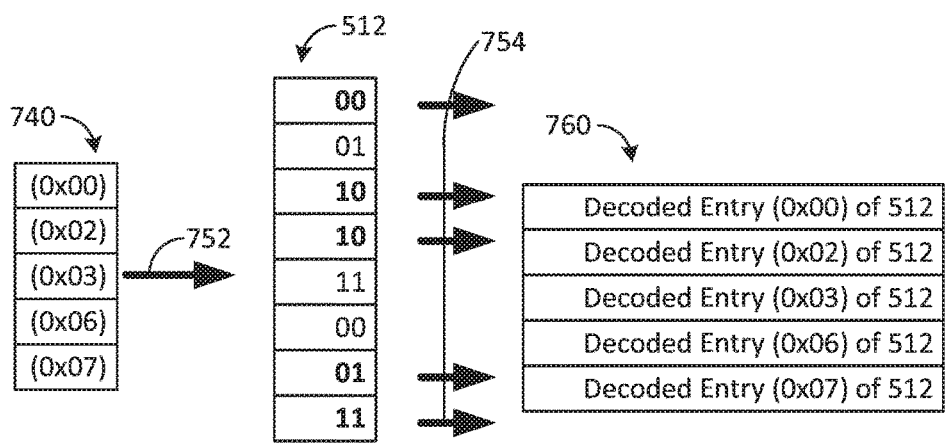

Although certain steps or actions are described in connection with FIG. 6, a process for performing gather selection for query 250 may include fewer than all steps described, and/or additional or alternative steps to those described.

Block 602 includes generating a second vector comprising a plurality of consecutive integer values. In some embodiments, the integer values may be one byte, two bytes, four bytes or eight bytes in length. For example, with reference to FIG. 7A, processor 106 may be configured to generate a second vector 702 having entries that are consecutive integer values. In some embodiments, the consecutive integers start with zero, and second vector 702 may have as many entries as the previously-described selection index vector 518.

Block 604 includes loading a first subset of values into respective lanes of a first register, the first subset comprising the consecutive integer values of the second vector. For example, with reference to FIG. 7A, processor 106 (FIG. 1) may load a first subset of consecutive integer values from second vector 702 into respective lanes of register 104a utilizing a loading operation 722.

Block 606 includes loading a second subset of values into respective lanes of a second register, the second subset comprising values of the first vector. For example, with reference to FIG. 7A, processor 106 (FIG. 1) may perform a loading operation 724 to load a second subset of values of selection byte vector 518 into respective lanes of register 104*b*. The first subset of values are those values at same positions within second vector 712 as the positions of the second subset of values within selection byte vector 518, and in the same order. Thus, when corresponding lanes of registers 104*a* and 104*b* are compared, the values in register 104*b* may act as a mask for values in register 104*a*.

Block 608 includes utilizing a single instruction to output integer values from the first register into an index vector based on the values in the second subset. For example, with reference to FIG. 7A, processor 106 (FIG. 1) may utilize a single AVX2 SIMD instruction, outputting operation 730, to output each integer value from register 104*a* into a third vector 740 where a respective lane of register 104*b* holds a value of the selection byte vector 518 indicating filter passing, and not output each integer value from register 104*a* into third vector 740 where a respective lane of register 104*b* holds a value of the selection byte vector 518 indicating filter not passing. In some embodiments, such an operation may be an AND operation between corresponding lanes of registers 104*a* and 104*b* (e.g., between integer values from second vector 712 loaded into register 104*a* and corresponding values from selection byte vector 518 loaded into register 104*b*). Third vector 740 may be known as a "selection index vector" and may indicate the ordinal positions of the rows of selection byte vector 518 which hold values indicating a filter pass.

Block 610 includes matching the integer values of the third vector with indices of the first column vector. For example, with reference to FIG. 7B, processor 106 (FIG. 1) may utilize AVX2 SIMD instructions to compare the integer values of third vector 740 with indices of first column vector 512.

Block 612 includes, based on the match, retrieving and decoding encoded values of the first column vector. For example, with reference to FIG. 7B, processor 106 (FIG. 1) may utilize AVX2 SIMD instructions to perform a retrieve or gather operation 752 that retrieves encoded values of column vector 512 that are stored at indices within column vector 512 that match the integer values of selection index vector 740. These retrieved encoded values may be directly loaded into corresponding lanes of one of registers 104*a*-104*n*. Processor 106 may perform a decoding operation 754 on the retrieved encoded values by looking up the decoded value mapped to the retrieved encoded values in an appropriate encoding dictionary to generate a decoded column vector 760. In some embodiments, such a decoding operation may utilize AVX2 SIMD instructions to operate on multiple retrieved encoded values simultaneously.

Gather selection effectively combines bit unpacking and removing filtered out rows of an encoded column vector. At least block 610 may be repeated for each column 222 of table 220 for which query 250 defines a "group by" parameter and for each column 222 of table 220 for which query 250 defines an aggregation parameter.

Selection by Special Group Assignment

Selection by special group assignment is to be used in combination with the "group by" aggregation that follows this type of selection. Selection by special group assignment is an optimization that may be viewed as pushing grouping and aggregation ahead of portions of the selection operation in the processing pipeline.

Figure 8:
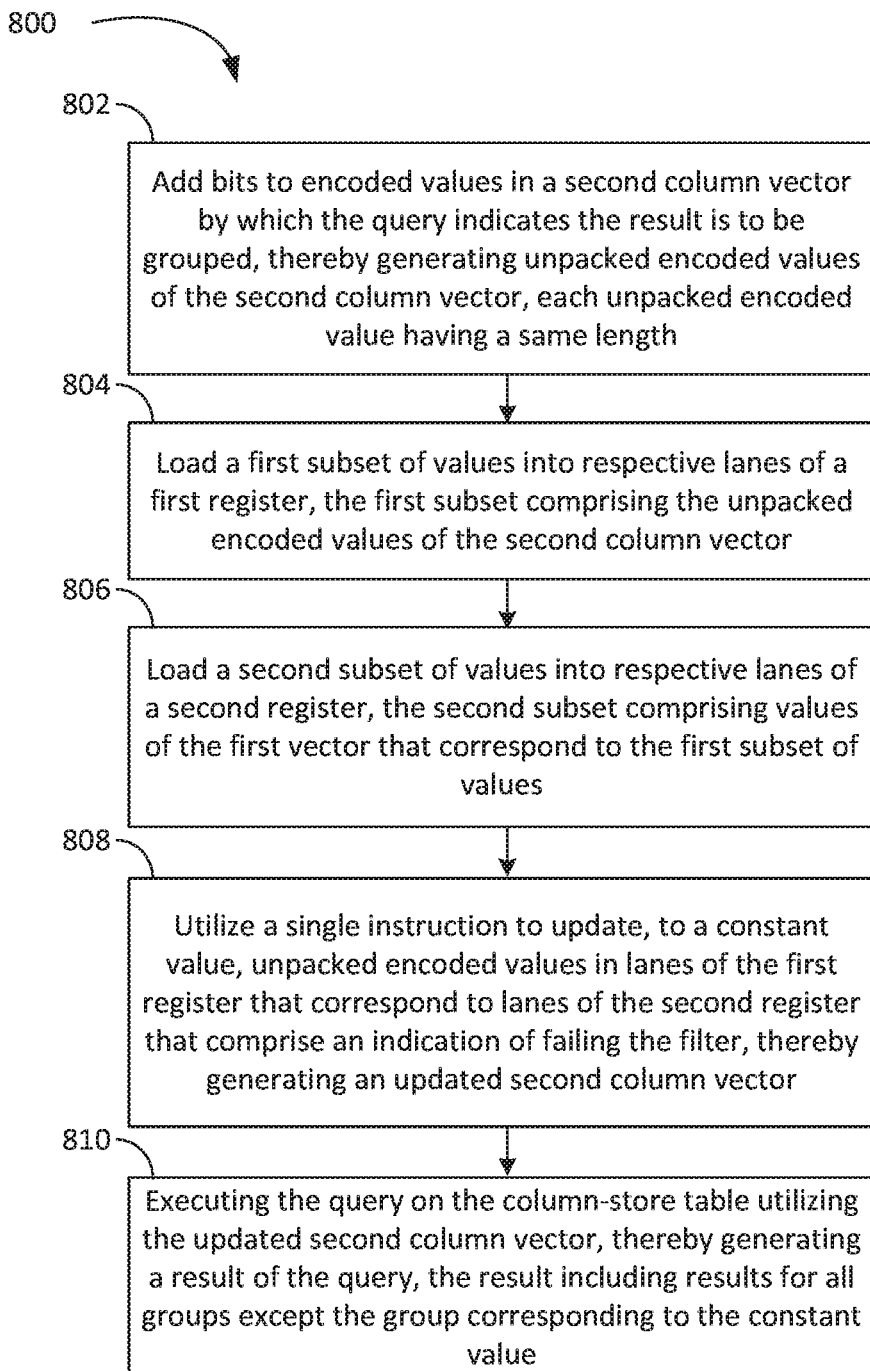
FIG. 8 illustrates a process for performing selection by special group assignment for a query, in accordance with some embodiments.
Figure 9:
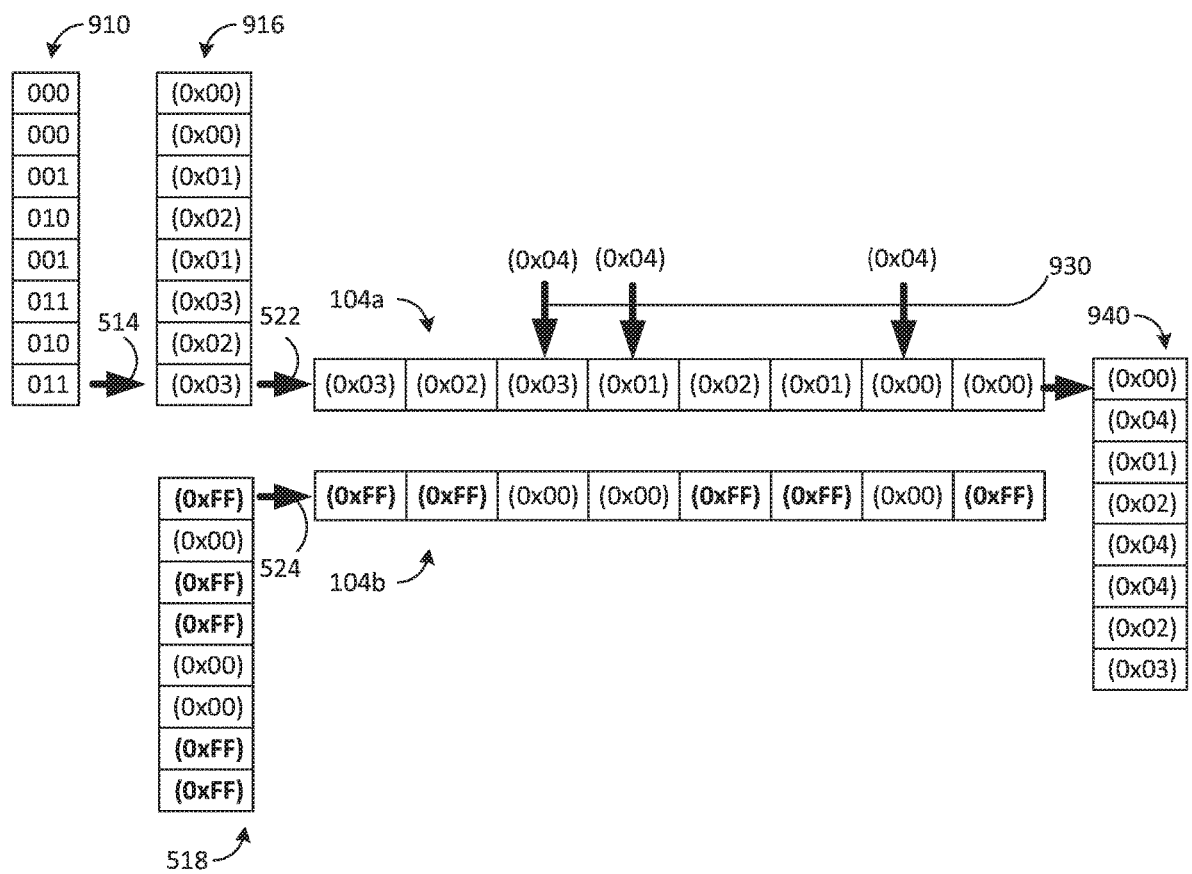
FIG. 9 is a block diagram illustrating certain data vectors, registers, and operations described by FIG. 8.

A description of selection by special group assignment follows with reference to FIG. 8, which illustrates a process for performing selection by special group assignment for a query 250, in accordance with some embodiments, and FIG. 9, which is a block diagram illustrating certain data vectors, registers, and operations described by FIG. 8.

Although certain steps or actions are described in connection with FIG. 8, a process for performing selection by special group assignment for query 250 may include fewer than all steps described, and/or additional or alternative steps to those described.

Block 802 includes adding bits to encoded values in a second column vector by which the query indicates the result is to be grouped, thereby generating unpacked encoded values of the second column vector, each unpacked encoded value having a same length. The same length may be one byte, two bytes, four bytes or eight bytes. Such encoded values may be considered group IDs, since each different encoded value represents a different entry by which a result may be grouped. For example, query 250 (FIG. 2) may comprise an indication of a second column vector having encoded values by which a result is to be grouped. Such an indication in query 250 may have the general form "group by" followed by the identifier of one or more columns 222 of table 220, e.g., "state". With reference to FIG. 9, encoded values of the second column vector 910 are not necessarily encoded in whole-byte lengths (e.g. 3 bits as shown in FIG. 9). Thus, to ensure maximum usage of registers 104*a*-104*n* (see FIG. 1) and to ensure encoded values of second column vector 910 each fit completely within a given register 104*a*, processor 106 (FIG. 1) may unpack encoded values of second column vector 910 to the next largest size of 1 byte, 2 bytes, 4 bytes, or 8 bytes, utilizing unpacking operation 514, to generate a corresponding second column vector 916 of unpacked encoded values.

Block 804 includes loading a first subset of values into respective lanes of a first register, the first subset comprising the unpacked encoded values of the second column vector. For example, with reference to FIG. 9, processor 106 (FIG. 1) may load a first subset of unpacked encoded values from unpacked second column vector 916, now having whole-byte lengths, into respective lanes of register 104*a* using a loading operation 522.

Block 806 includes loading a second subset of values into respective lanes of a second register, the second subset comprising values of the first vector that correspond to the first subset of values. For example, with reference to FIG. 9, processor 106 (FIG. 1) may perform loading operation 524 to load a second subset of values of selection byte vector 518 into respective lanes of register 104*b*. A same number of values of selection byte vector 518 are loaded into register 104*b* as unpacked encoded values are loaded into register 104*a*, and in the same order.

Block 808 includes utilizing a single instruction to update, to a constant value, unpacked encoded values in lanes of the first register that correspond to lanes of the second register that comprise an indication of failing the filter, thereby generating an updated second column vector. For example, with reference to FIG. 9, processor 106 (FIG. 1) may utilize a single AVX2 SIMD instruction, updating operation 930, to update, to a constant value (e.g., 0x04), unpacked encoded values in lanes of register 104*a* that correspond to lanes of register 104*b* comprising an indication of failing the filter (e.g., 0x00), thereby generating updated second column vector 940. In some embodiments, the constant value may be a first unused value of unpacked second column vector 916 (e.g., 0x04 is shown in FIG. 9 as the first unused value). However, any unused value of unpacked second column vector 916 may also be utilized. Such an updating operation may be, for example, a NOT AND operation between corresponding lanes of registers 104*a* and 104*b* (e.g., between unpacked encoded values from unpacked second column vector 916 loaded into register 104a and corresponding values from selection byte vector 918 loaded into register 104b).

Block 810 includes executing the query on the column-store table utilizing the updated second column vector, thereby generating a result of the query, the result including results for all groups except the group corresponding to the constant value. For example, with reference to FIG. 9, processor 106 (FIG. 1) may execute query 250 on column-store table 220, without regard to the filter defined by query 250, utilizing updated second column vector 940 that now includes the constant value in updated rows. Accordingly, by updating the entries in second column vector 940 for rows not passing the filter defined by query 250, the disqualified rows are effectively grouped into the constant value's group and may be discarded before outputting the result of query 250 without fully processing the filter. Performing the query may include executing any "group by" and any "aggregation" operation as defined by query 250.

Comparison of Selection by Compacting, Gather Selection, and Selection by Special Group Assignment In general, gather selection would be best suited for filters having low selectivity (where a relatively small proportion of rows in batch 230 of table 220 pass or satisfy the conditions of the filter of query 250), selection by compacting would be best suited for filters having intermediate selectivity, and selection by special group assignment would be best suited for filters having selectivity close to 1 (where nearly all rows in batch 230 of table 220 pass or satisfy the conditions of the filter or query 250).

Per-row costs of running queries for all 3 of these methods may be expressed as $c_{compact}$, $c_{gather}$, and $c_{special}$, respectively. If the cost of aggregating a result (e.g., calculating a sum, min, max, avg, standard deviation, etc.) is expressed as $c_{aggregate}$ and filter selectivity is expressed as $\alpha$, gather selection will outperform selection by compaction when $\alpha < c_{compact}/c_{gather}$ and selection by compaction will outperform selection by special group assignment when $\alpha < (c_{special}+c_{aggregate}-c_{compact})/c_{aggregate}$. Accordingly, for each bit width of encoded data there is a fixed filter selectivity beyond which selection by compacting starts to outperform gather selection. For example, it has been determined that, for 4 bit widths, selection by compacting outperforms gather selection for filter selectivity of ≥~2% (at least 2 percent of rows pass the filter), for 7 bit widths, selection by compacting outperforms gather selection for filter selectivity of ≥~4%, for 14 bit widths, selection by compacting outperforms gather selection for filter selectivity of ≥~30%, and for 21 bit widths, selection by compacting outperforms gather selection for filter selectivity of ≥~38%.

Sort Based Group by Sum

Sort based group by sum operations using SIMD sort row indices within each batch 230 of rows into groups based on the indications of how results are to be grouped in query 250.

Figure 10:
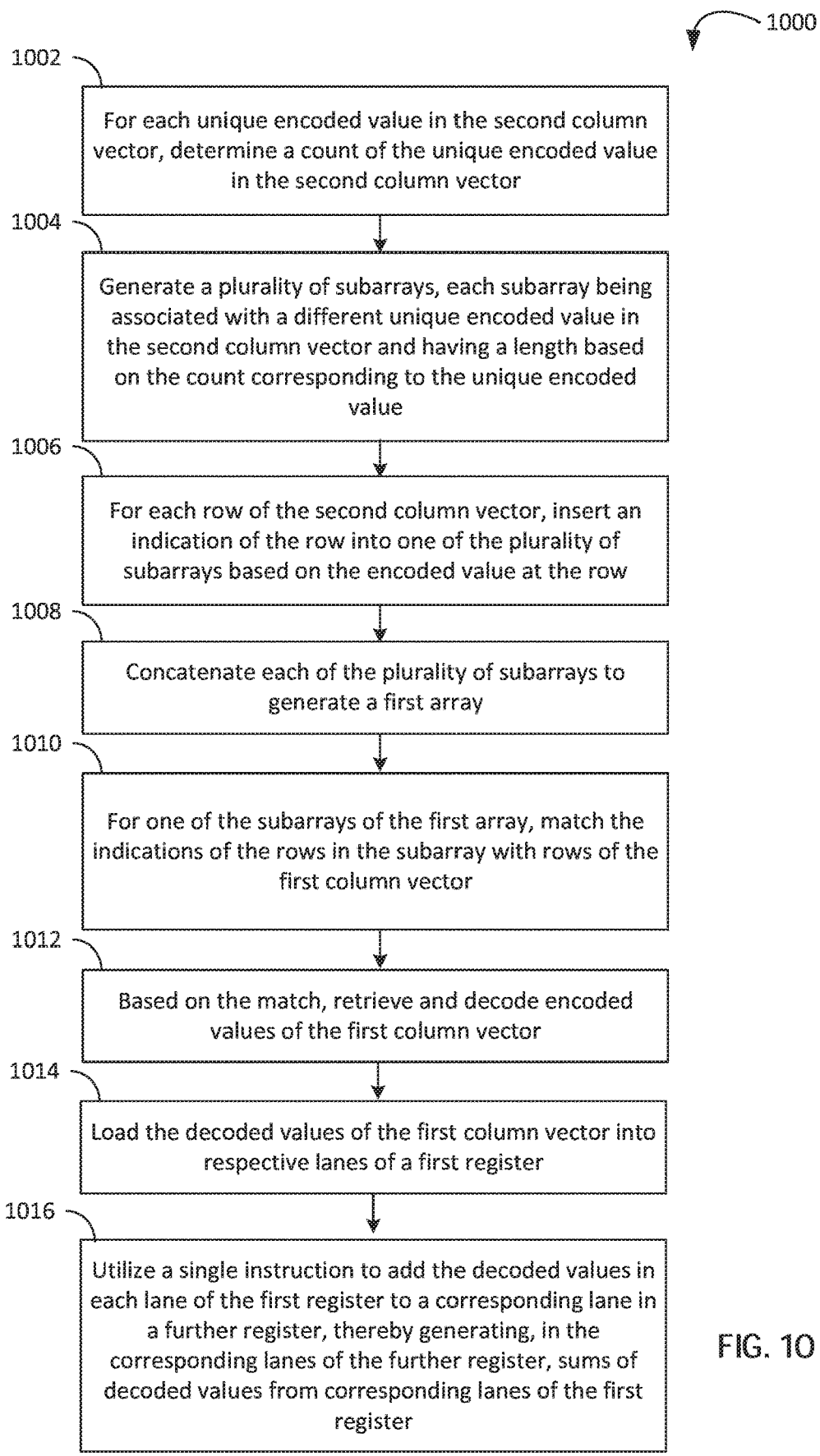
FIG. 10 illustrates a process for performing sort based group by sum for a query, in accordance with some embodiments.
Figure 11A:
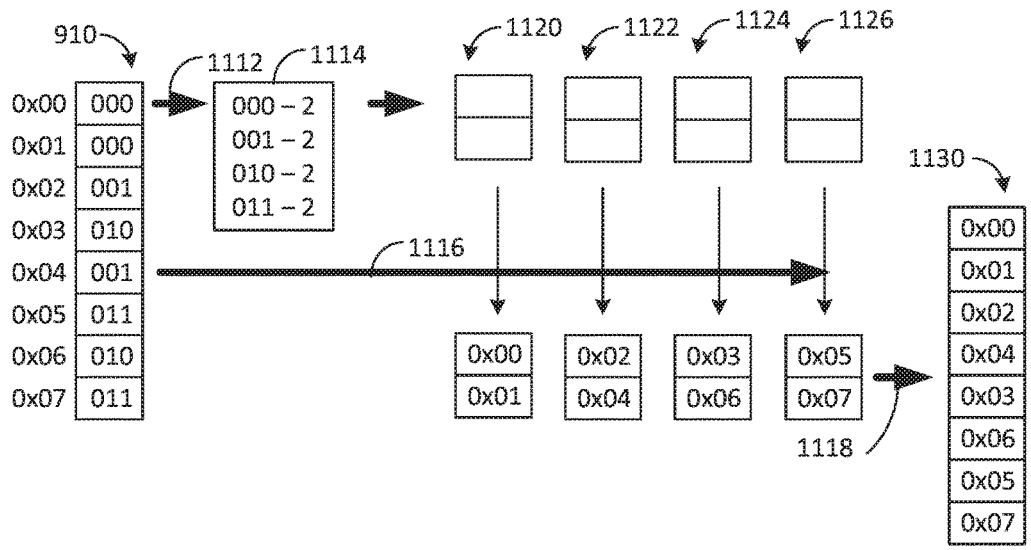
FIGS. 11A and 11B illustrate block diagrams of certain data vectors, registers, and operations described by FIG. 10.
Figure 11B:
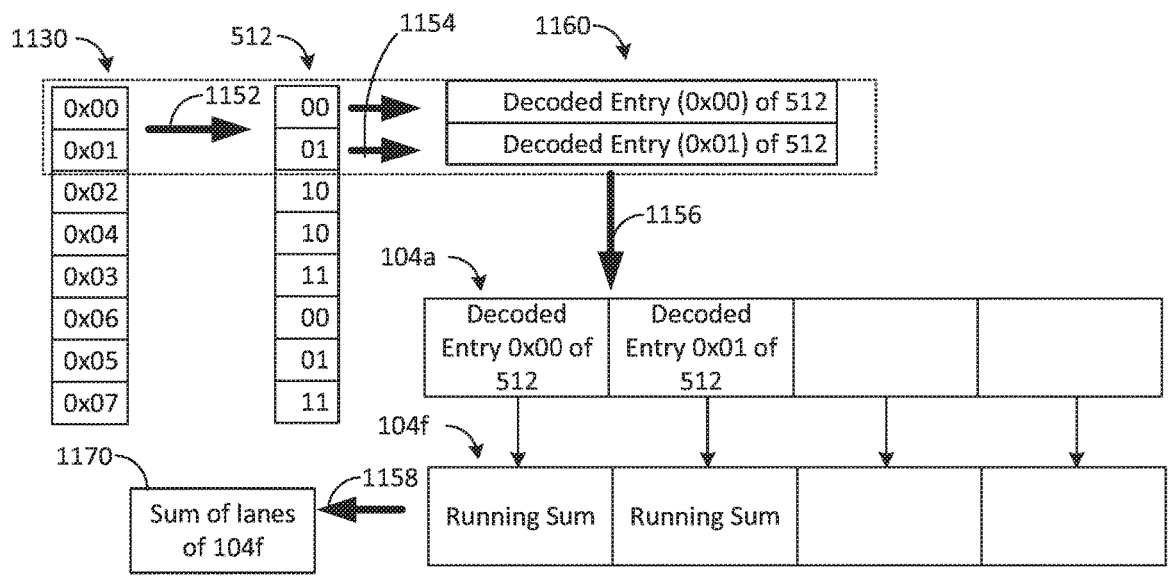

A description of sort based group by sum follows with reference to FIG. 10, which illustrates a process for performing sort based group by sum for a query 250, in accordance with some embodiments, and FIGS. 11A and 11B, which illustrate certain data vectors, registers, and operations that are the subject of the process of FIG. 10.

Although certain steps or actions are described in connection with FIG. 10, a process for performing sort based group by sum for query 250 may include fewer than all steps described, and/or additional or alternative steps to those described.

Block 1002 includes, for each unique encoded value in the second column vector, determining a count of the unique encoded values in the second column vector. For example, query 250 (FIG. 2) may comprise an indication of a second column vector having encoded values by which a result is to be grouped. Such an indication in query 250 may have the general form "group by" followed by an indication of one or more columns 222 of table 220, e.g., "state". With reference to FIG. 11A, processor 106 may be configured to perform a group by count(*) operation 1112 on second column vector 910, which returns a respective count 1114 for each unique encoded value in second column vector 910. In some embodiments, having the same encoded value occurring in consecutive rows of second column vector 910 may cause write conflicts in single counters utilized to track the count of each group indicated by second column vector 910. Accordingly, in some embodiments, to avoid such write conflicts, two or more counters may be utilized for tracking the count of each group and partial sums from each counter for a given group may be added together at the end of the counting process.

Block 1004 includes generating a plurality of subarrays, each subarray being associated with a different unique encoded value in the second column vector and having a length based on the count corresponding to the unique encoded value. For example, with reference to FIG. 11, processor 106 (FIG. 1) may generate a plurality of subarrays 1120, 1122, 1124, 1126. Each subarray 1120, 1122, 1124, 1126 has a length based on respective count 1114 of the corresponding unique encoded value in second column vector 910.

Block 1006 includes, for each row of the second column vector, inserting an indication of the row into one of the plurality of subarrays based on the encoded value at the row. For example, with reference to FIG. 11A, processor 106 (FIG. 1) may perform an inserting operation 1116 for each index of second column vector 910, by inserting the indication of the row into one of the plurality of subarrays 1120, 1122, 1124, 1126 based on the encoded value in the row.

Block 1008 includes concatenating each of the plurality of subarrays to generate a first array. For example, with reference to FIG. 11A, processor 106 (FIG. 1) may perform a concatenating operation 1118 to concatenate each of the plurality of subarrays 1120, 1122, 1124, 1126 to generate a first array 1130 of sorted rows for the second column vector. First array 1130 contains indications of all rows within a batch 230 that fall into that group. Utilizing such an array, sums of the encoded values at the row of one or more columns may then be computed. In some embodiments, the concatenating step of block 1008 may be optional. For example, such a concatenation may instead comprise a logical operation in which the plurality of subarrays 1120, 1122, 1124, 1126, which may be physically stored adjacent to one another in memory, are not actually concatenated to form first array 1130 but instead are alternatively interpreted, together, as first array 1130.

Block 1010 includes, for one of the subarrays of the first array, matching the indications of the rows in the subarray with rows of the first column vector. For example, with reference to FIG. 11B, processor 106 (FIG. 1) may be configured to perform a matching operation 1152 that matches indications of the rows in subarray 1120 of first array 1130 with rows of first column vector 512.

Block 1012 includes, based on the match, retrieving and decoding encoded values of the first column vector. For example, with reference to FIG. 11B, processor 106 (FIG. 1) may be configured to, based on the match at block 1010, retrieve, via a retrieving operation 1154, and decode, via a decoding operation 1156, encoded values of first column vector 512. Accordingly, processor 106 may retrieve encoded values located at rows of first column vector 512 that match the indications of the rows in subarray 1120 of first array 1130. Processor 106 may utilize the encoded values to perform a lookup in the encoding dictionary corresponding to the encoded values and return the decoded values 1160. In some embodiments, the decoding portion of block 1012 may be optional. For example, in some cases, for numeric columns having encoded values small enough to fit within 64-bit registers, for example, where a range of small integers (e.g., 0-10) are encoded utilizing a smallest number of bits that may uniquely represent each of the small numbers, decoding may not be necessary as the encoded values may still be added without decoding to larger, expanded byte-level lengths. For example, where the numbers 0-10 are encoded utilizing 4 bits (e.g., the integer 1 is represented as 0001, the integer 2 is represented as 0010, the integer 3 is represented as 0011, etc.), the encoded 4-bit values may be added without decoding to larger, expanded byte-level sizes. In such embodiments, block 1012 may comprise, based on the match, retrieving the encoded values from the first column vector.

Block 1014 includes loading the decoded values of the first column vector into respective lanes of a first register. For example, with reference to FIG. 11B, processor 106 may be configured to load the decoded values 1160 of first column vector 512 into respective lanes of register 104a. Although only two values are shown as being loaded into register 104a, this is merely an example and any number of qualifying values may be loaded into register 104a. In embodiments where the decoding portion of block 1012 is not performed, as described above, block 1014 may instead operate utilizing the encoded values of the first column vector.

Block 1016 includes utilizing a single instruction to add the decoded values in each lane of the first register to a corresponding lane in a further register, thereby generating, in the corresponding lanes of the further register, sums of decoded values from corresponding lanes of the first register. For example, with reference to FIG. 11B, processor 106 may be configured to utilize a single instruction, e.g., a SIMD instruction, to add the decoded values in each lane of register 104a to a corresponding lane in register 104f, thereby generating, in the corresponding lanes of register 104f, sums of decoded values from corresponding lanes of register 104a. The loading step of block 1014 and the operations of block 1016 may be repeated until all values for the particular column and particular group have been processed. Then, processor 106 may determine a sum 1170 for a group, as indicated by query 250, by utilizing a summing operation 1158, sometimes also referred to as "reducing," that adds all running sums in the lanes of register 104f to obtain a sum 1170 of the lanes of register 104f. Sum 1170 may comprise a sum indicated by query 250.

Processor 106 may carry out this matching, retrieval, decoding, loading and summing operation for each column, and for each group, for which a sum is indicated by query 250.

In-Register Group by Count and Group by Sum

In some embodiments, computing aggregates with grouping may be based on keeping intermediate results entirely in CPU registers instead of in memory 120. Some such embodiments may be utilized where a number of groups by which results are to be grouped is approximately 32 or less. Each aggregate (sum, minimum, maximum, etc.) may be processed separately.

Figure 12:
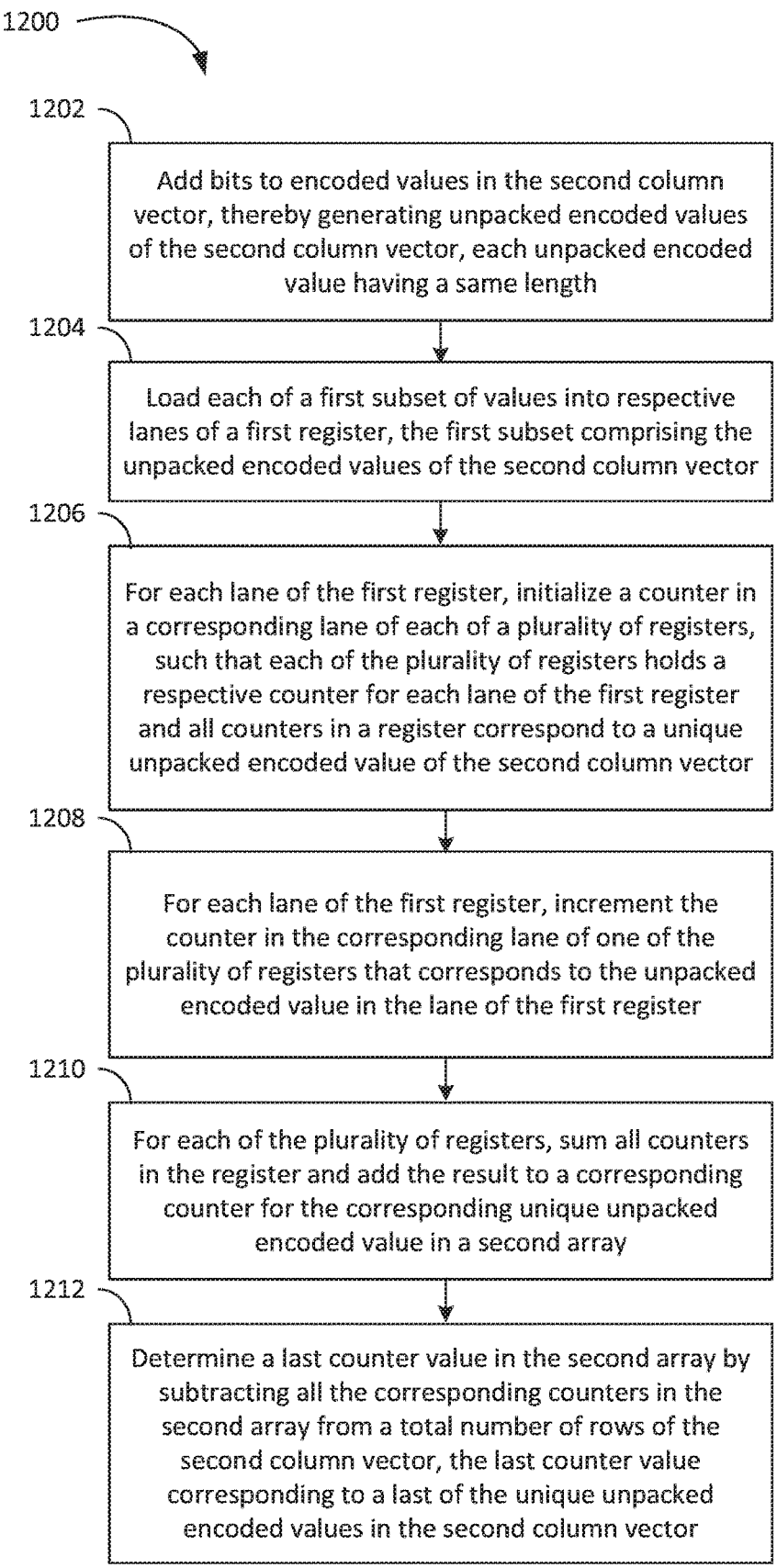
FIG. 12 illustrates a process for performing in-register group by count and group by sum for a query, in accordance with some embodiments.
Figure 13:
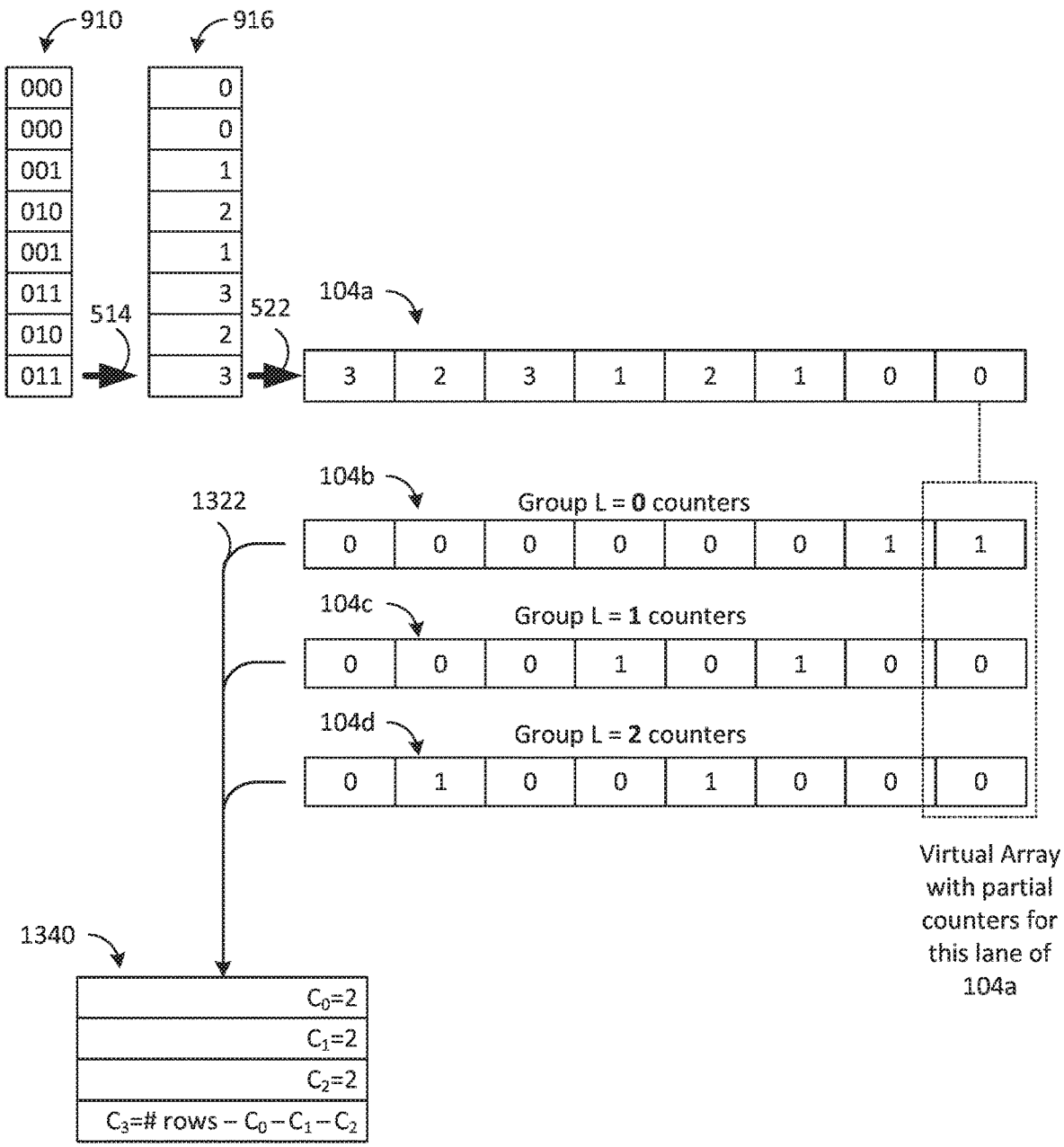
FIG. 13 is a block diagram illustrating certain data vectors, registers, and operations described by FIG. 12.

A description of in-register group by count and group by sum follows with reference to FIG. 12, which illustrates a process for performing in-register group by count and group by sum for a query 250, in accordance with some embodiments, and FIG. 13, which is a block diagram illustrating certain data vectors, registers, and operations described by FIG. 12.

Although certain steps or actions are described in connection with FIG. 12, a process for performing in-register group by count and group by sum for query 250 may include fewer than all steps described, and/or additional or alternative steps to those described.

Query 250 further comprises an indication of a second column vector 910 having encoded values by which a result of query 250 is to be grouped. As an example, assume query 250 defines a result as a number of rows of a column that correspond to each group, as identified by 1-byte encoded values within the column (e.g., group by count).

Block 1202 includes adding bits to encoded values in the second column vector, thereby generating unpacked encoded values of the second column vector, each unpacked encoded value having a same length. The same length may be one byte, although any other whole-byte length is contemplated. Such encoded values may be considered group IDs, since each different encoded value represents a different entry by which a result may be grouped. For example, query 250 (FIG. 2) may comprise an indication of second column vector 910 having encoded values by which a result is to be grouped. Such an indication in query 250 may have the general form "group by" followed by the identifier of one or more columns 222 of table 220, e.g., "state". With reference to FIG. 13, encoded values of the second column vector 910 are not necessarily encoded in whole-byte lengths (e.g. 3 bits as shown in FIG. 13). Thus, to ensure maximum usage of register 104a (see FIG. 1) and to ensure encoded values of second column vector 910 each fit completely within a given register 104a, processor 106 (FIG. 1) may unpack encoded values of second column vector 910 to the next largest size of 1 byte, utilizing unpacking operation 514, to generate a corresponding second column vector 916 of unpacked encoded values.

Block 1204 includes loading each of a first subset of values into respective lanes of a first register, the first subset comprising the unpacked encoded values of the second column vector. For example, with reference to FIG. 13, processor 106 (FIG. 1) may load each of a first subset of unpacked encoded values from unpacked second column vector 916, now having whole-byte lengths, into respective lanes of register 104a utilizing load operation 522.

Block 1206 includes, for each lane of the first register, initializing a first counter in a corresponding lane of each of a plurality of further registers, such that each of the plurality of further registers holds a respective first counter for each lane of the first register and all first counters in each further register correspond to a unique unpacked encoded value of the second column vector. For example, with reference to FIG. 13, processor 126 (FIG. 1) may initialize a partial counter in a corresponding lane of each of a plurality of registers 104b, 104c, 104d, such that each of the plurality of registers 104b-104e holds a respective partial counter for each lane of first register 104a and all partial counters in a register 104b, 104c, 104d, 104e correspond to a unique unpacked encoded value of second column vector 916. For example, register 104b may hold partial counters for group "0", register 104c may hold partial counters for group "1", register 104d may hold partial counters for group "2" and register 104e may hold partial counters for group "3".

Although only 4 registers 104b-104e are shown, such an implementation would have N−1 registers holding partial counters for N−1 of N unique unpacked encoded values in column vector 916. As will be described in more detail below, one less register than there are groups N can be utilized since the last group count can be obtained by subtracting all other group counts from the total number of rows in second column vector 916.

Block 1208 includes, for each lane of the first register, incrementing the first counter in the corresponding lane of one of the plurality of further registers that corresponds to the unpacked encoded value in the lane of the first register. For example, with reference to FIG. 13, processor 126 (FIG. 1) may proceed, lane by lane for register 104a, to increment the partial counter in the corresponding lane of one of the plurality of registers 104b-104e that corresponds to the unpacked encoded value in the lane of first register 104a. For example, working from the right to the left, the first lane of register 104a holds the unpacked encoded value "0". Thus, the partial counter in the corresponding lane of register 104b, which holds partial counters for group "0", is incremented, e.g., its value is changed to 0xFF or 1. The second lane of register 104a also holds the unpacked encoded value "0". Thus, the partial counter in the corresponding lane of register 104b is incremented, e.g., its value is changed to 0xFF or 1. The third and fifth lanes of register 104a hold the unpacked encoded value "1". Thus, the partial counters in the corresponding lanes of register 104c, which holds counters for group "1", are incremented, e.g., its value is changed to 0xFF or 1. The fourth and seventh lanes of register 104a hold the unpacked encoded value "2". Thus, the partial counters in the corresponding lanes of register 104d, which holds counters for group "2", are incremented, e.g., its value is changed to 0xFF or 1. As may be appreciated, only one lane across registers 104b-104d will be incremented for any corresponding unpacked encoded value in the corresponding lane of register 104a, each time register 104a is loaded with subsequent sets of unpacked encoded values from second column vector 916.

Block 1210 includes, for each of the plurality of further registers, summing first counters in the further register and adding the sum to a corresponding second counter for the corresponding unique unpacked encoded value. For example, with reference to FIG. 13, processor 126 (FIG. 1) may be configured to perform a summing operation 1322 that, for each register 104b-104d, sums all partial counters in a particular register 104b, for example, and adds the result to a corresponding total counter in second array 1340. As shown, register 104b has two lanes (the first and second lanes) with values of 1, which may be summed and added to the corresponding total counter $C_0$ in second array 1340. Similarly, the two 1 valued lanes of each of registers 104c and 104d may be summed and added to corresponding total counters $C_1$ and $C_2$, respectively, in second array 1340. Accordingly, registers 104b-104d may hold partial counters for occurrences of unique unpacked encoded values in each loading of register 104a, while second array 1340 holds total counters for occurrences of the unique unpacked encoded values across all loadings of register 104a described in this section.

In embodiments where the incremented value of partial counters in registers 104b-104d is 0xFF, such summing operation may include negating the incremented value 0xFF (since 0xFF means subtracting 1 for signed 8-bit integers) and merging each value into the counters in second array 1340. In some embodiments, the actions of block 1210 may be carried out utilizing a single set of SIMD instructions for registers 104a-104d.

Block 1212 includes determining a third counter by subtracting the corresponding second counters from a total number of rows of the second column vector, the third counter value corresponding to a last of the unique unpacked encoded values in the second column vector. For example, with reference to FIG. 13, processor 126 (FIG. 1) may be configured to determine a last total counter $C_3$ in second array 1340 by subtracting all the corresponding total counters $C_0$, $C_1$, $C_2$ in the second array from a total number of rows of second column vector 916. The last total counter value $C_3$ corresponds to a last of the unique unpacked encoded values, e.g., value "3", in second column vector 916.

Multi-Aggregate Group by Sum

In some embodiments, query 250 may require determination of multiple sums across multiple columns. Whereas previous embodiments utilize data level parallelism vertically, embodiments utilizing this multi-aggregate group by sum process may utilize data level parallelism horizontally, meaning multiple aggregates across multiple columns for a same input row are summed instead of multiple input rows for the same aggregate column. In some embodiments, row-at-a-time aggregation for multiple sums may be faster than column-at-a-time aggregation. Further improvement may be obtained by loading inputs for multiple sums for the same row into one register and execute only one set of load-add-store instructions for all of them. As previously stated, column-store tables store values column-wise in memory. Accordingly, values from columns to be summed are reorganized via matrix transposing, as described in more detail below.

Figure 14:
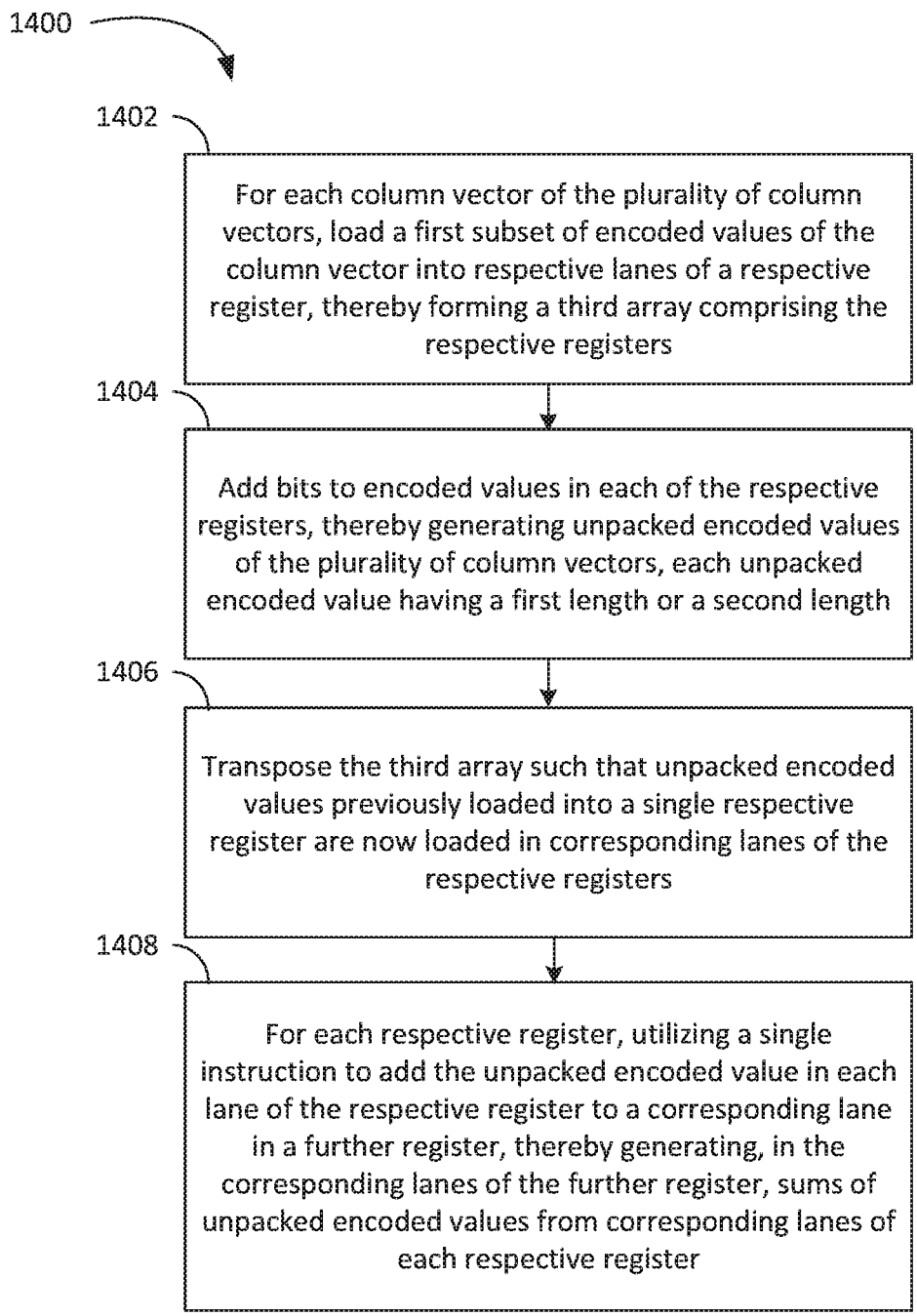
FIG. 14 illustrates a process for performing multi-aggregate group by sum for a query, in accordance with some embodiments.
Figure 15:
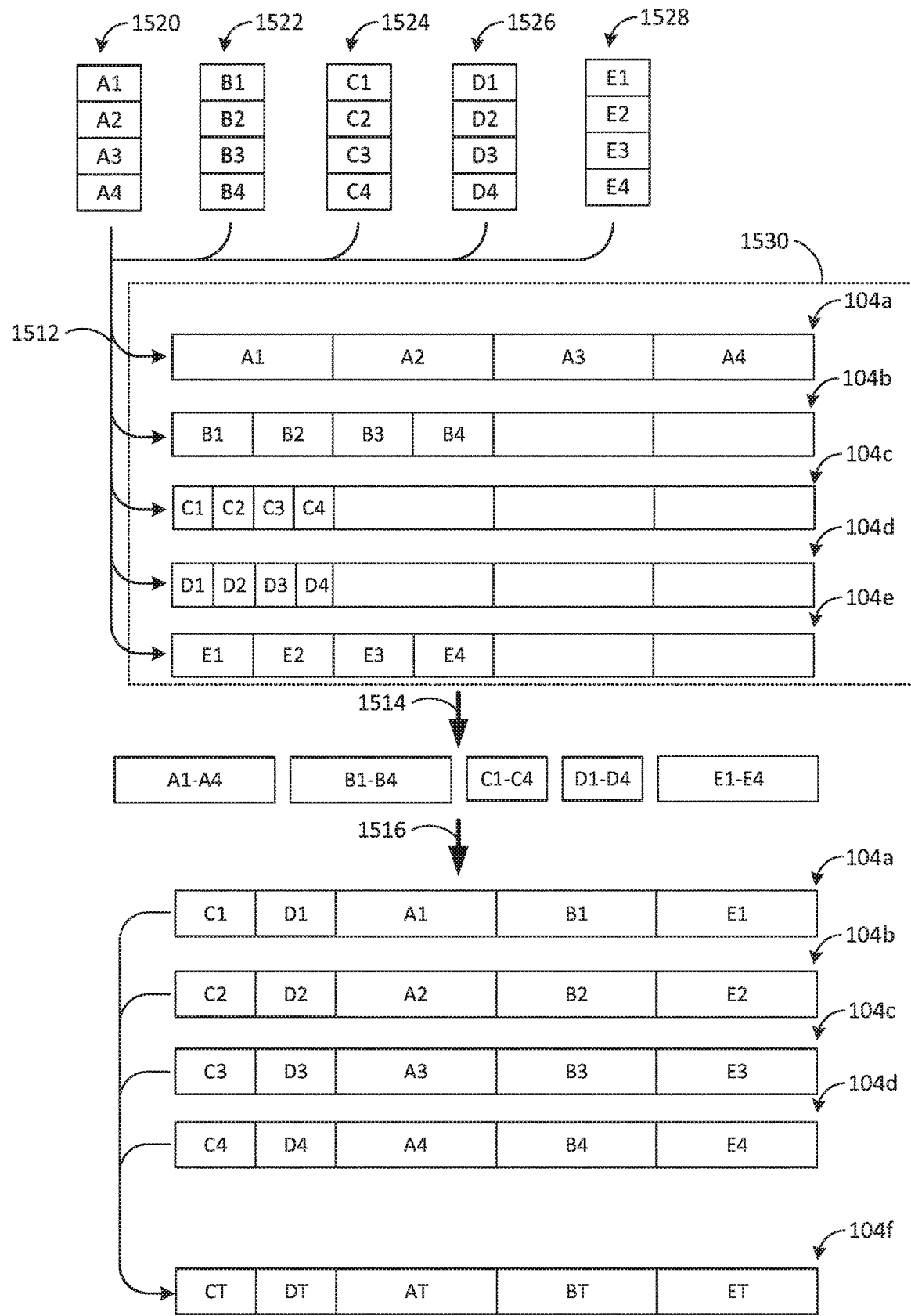
FIG. 15 is a block diagram illustrating certain data vectors, registers, and operations described by FIG. 14.

A description of multi-aggregate group by sum follows with reference to FIG. 14, which illustrates a process for performing multi-aggregate group by sum for a query 250, in accordance with some embodiments, and FIG. 15, which is a block diagram illustrating certain data vectors, registers, and operations described by FIG. 14.

Although certain steps or actions are described in connection with FIG. 14, a process for performing multi-aggregate group by sum for query 250 may include fewer than all steps described, and/or additional or alternative steps to those described.

Referring to FIG. 15, query 250 (FIG. 2) may comprise an indication of a plurality of column vectors 1520, 1522, 1524, 1526, 1528 (see FIG. 15), each having encoded values that are to be summed and by which a result of the query is to be grouped. Encoded values of column vectors 1520, 1522, 1524, 1526 are not shown in FIG. 15, and are instead indicated as A1-A4, B1-B4, C1-C4, D1-D4 and E1-E4 for simplicity.

Now referring to FIG. 14, block 1402 includes, for each column vector of the plurality of column vectors, loading a first subset of encoded values of the column vector into respective lanes of a respective register, thereby forming a third array comprising the respective registers. For example, with reference to FIG. 15, processor 106 (FIG. 1) may be configured to perform a loading operation 1512 that loads respective first subsets of encoded values A1-A4, B1-B4, C1-C4, D1-D4 and E1-E4 from respective column vectors 1520, 1522, 1524, 1526, 1528 into respective registers 104a, 104b, 104c, 104d, 104e. Thus, a third array 1530 comprises the encoded values in registers 104a-104e as shown in the middle of FIG. 15. As a non-limiting example, encoded values A1-A4 have a length of 64-bits (8 bytes), encoded values B1-B4 and E1-E4 have a length of 32-bits (4 bytes), encoded values C1-C4 and D1-D4 have a length of 16-bits (2 bytes), and registers 104a-104e are 256-bit (32 byte) registers. In some embodiments, loading operation 1512 may comprise AVX2 SIMD instructions that allow a single instruction to gather and load multiple rows of data into registers 104a-104e simultaneously.

Block 1404 includes adding bits to encoded values in each of the respective registers, thereby generating unpacked encoded values of the plurality of column vectors, each unpacked encoded value having a first length or a second length. A challenging aspect of converting columns to rows efficiently is that, in general, there can be different numbers of input columns and they may store elements of different byte sizes. A composition of template functions may be used to create specialized SIMD implementations where processor 106 (FIG. 1) may be configured to unpack encoded values A1-A4, B1-B4, C1-C4, D1-D4 and E1-E4 to either 4-byte lengths (e.g., a first length) or 8-byte lengths (e.g., a second length) by adding padding zeros such that 1- or 2-byte length encoded values are unpacked to 4 bytes and encoded values having a greater length are unpacked to 8 bytes utilizing unpacking operation 1514. This ensures that up to 65,536 rows can be summed using, e.g., 64-bit additions in SIMD lanes of registers 104a-104e without an overflow for input values of up to 4-bytes. Such embodiments support arbitrary number and combinations of sizes of input columns so long as, after expansion, all elements for a single row can fit into a 256-bit SIMD register with 32-bit expanded elements being 32-bit aligned and 64-bit elements 64-bit aligned.

Block 1406 includes transposing the third array such that unpacked encoded values previously loaded into a single respective register are now loaded in corresponding lanes across each of the respective registers. For example, with reference to FIG. 15, processor 106 (FIG. 1) may be configured to perform transposing operation 1516, which may realign all entries within registers 104a-104e such that unpacked encoded values, e.g., A1-A4, previously loaded into a single respective register, e.g., 104a, are now loaded in corresponding lanes of the respective registers 104a-104d. For example, unpacked encoded values C1-C4 are shown as being transposed from lanes in only register 104c to the first 32-bit lane of each of registers 104a-104d; unpacked encoded values D1-D4 are shown as being transposed from lanes in only register 104d to the second 32-bit lane of each of registers 104a-104d; and each of unpacked encoded values A1-A4, B1-B4, and E1-E4, are shown as being transposed from lanes in registers 104a, 104b and 104e to respective 64-bit lanes in each of registers 104a-104d.

Block 1408 includes for each respective register, utilizing a single instruction to add the unpacked encoded value in each lane of the respective register to a corresponding lane in a further register, thereby generating, in the corresponding lanes of the further register, sums of unpacked encoded values from corresponding lanes of each respective register. For example, with reference to FIG. 15, processor 106 (FIG. 1) may utilize a single AVX2 SIMD instruction for each register 104a-104d to add the unpacked encoded value in each lane of the respective register to a corresponding lane in further register 104f. In further example, one instruction may add C1, D1, A1, B1 and C1 to the respective values CT, DT, AT, BT and ET in register 104f. For the first addition, each of CT, DT, AT, BT and ET may have a value of zero. Another instruction may add C2, D2, A2, B2 and C2 to the respective values CT, DT, AT, BT and ET in register 104f. Another instruction may add C3, D3, A3, B3 and C3 to the respective values CT, DT, AT, BT and ET in register 104f; and yet another instruction may add C4, D4, A4, B4 and C4 to the respective values CT, DT, AT, BT and ET in register 104f. Accordingly, running sums (e.g., CT, DT, AT, BT and ET) of unpacked encoded values from corresponding lanes of each respective register 104a-104d are held in the corresponding lanes of register 104f. Such transposing of array 1530, comprising originally loaded registers 104a-104e, allows encoded entries from multiple columns to be regrouped into registers as if they were originally entries within a single column, allowing them to be summed in single operations.

Fast Group by Count(*) Using Bit-Level Logic

It is further possible to improve the performance for group by count (*) on bit packed columns having encoded values by which a result of the query is to be grouped. Such a process may be particularly useful where the number of groups (e.g., the number of unique encoded values, and therefore the bit length of the encoded values) are relatively small. A description for such fast group by count(*) using bit-level logic follows with reference to FIG. 16, which illustrates a process for performing fast group by count(*) using bit-level logic for a query 250, in accordance with some embodiments, and FIG. 17, which is a block diagram illustrating certain data vectors, registers, and operations described by FIG. 16.

Although certain steps or actions are described in connection with FIG. 16, a process for fast group by count(*) using bit-level logic for query 250 may include fewer than all steps described, and/or additional or alternative steps to those described.

Figure 17:
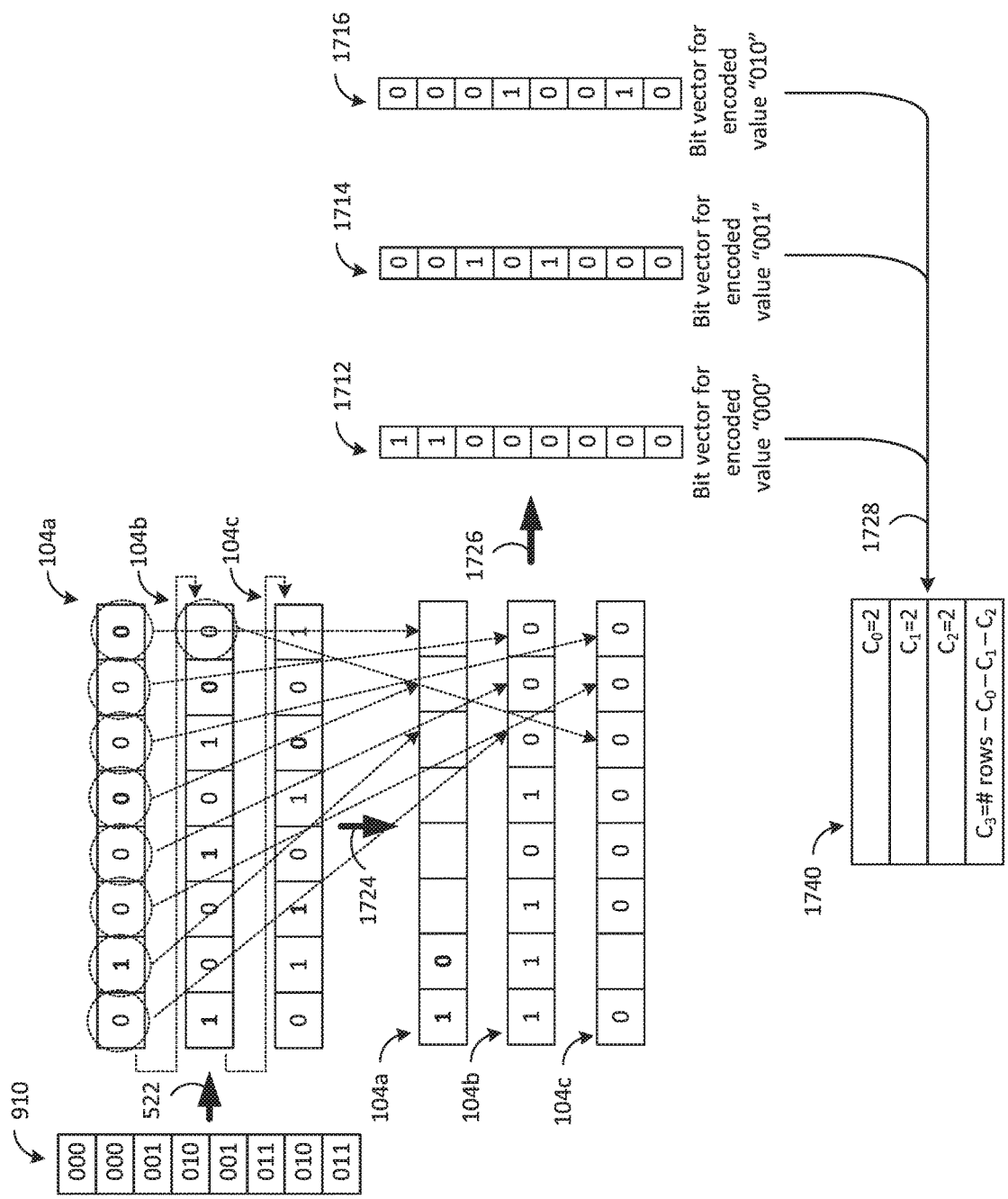
FIG. 17 is a block diagram illustrating certain data vectors, registers, and operations described by FIG. 16.

Referring to FIG. 17, query 250 (FIG. 2) may comprise an indication of second column vector 910 having encoded values by which a result of query 250 is to be grouped.

Figure 16:
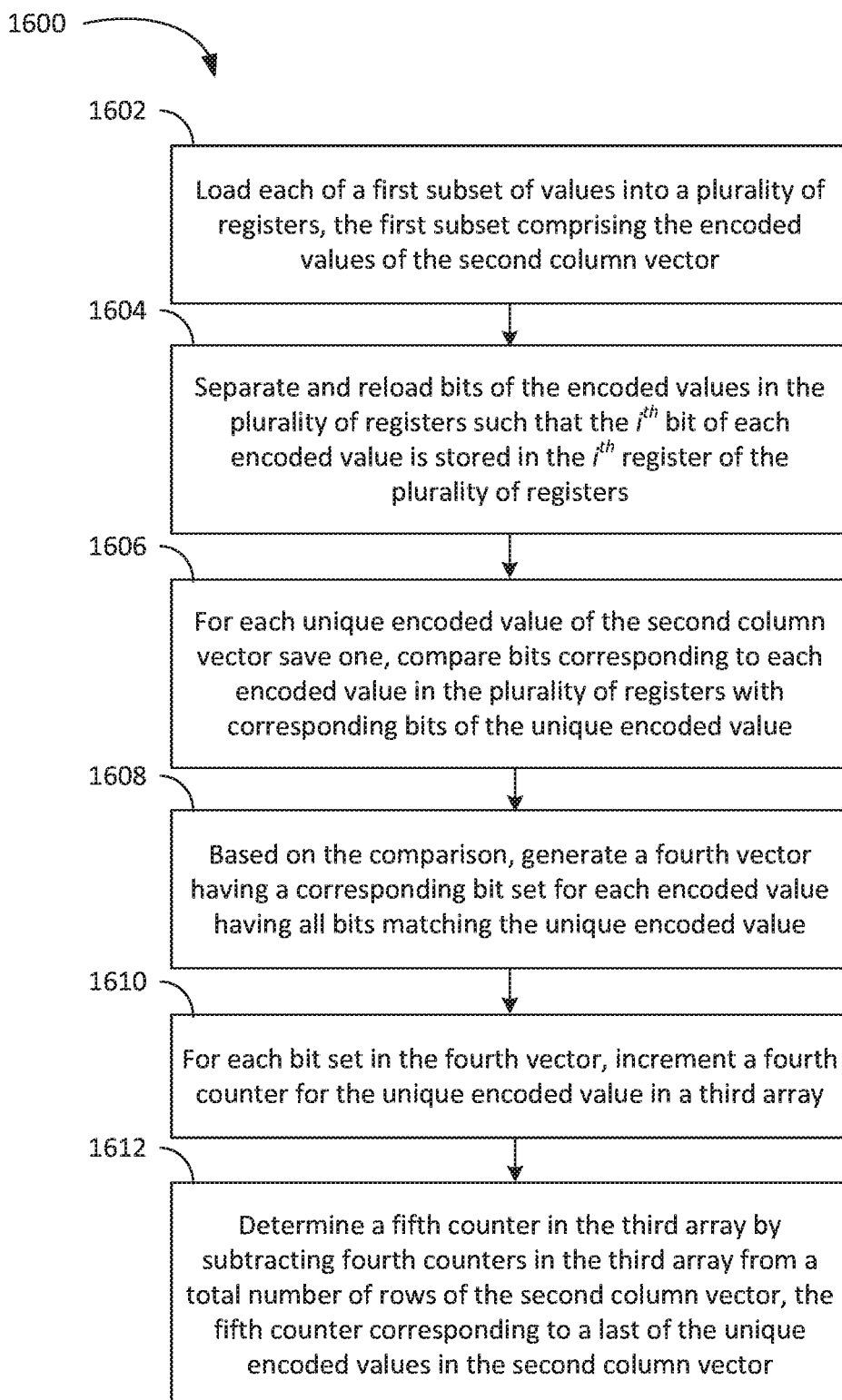
FIG. 16 illustrates a process for performing fast group by count(*) using bit-level logic for a query, in accordance with some embodiments.

Referring to FIG. 16, block 1602 includes loading each of a first subset of values into a plurality of registers, the first subset comprising the encoded values of the second column vector. For example, with reference to FIG. 17, processor 106 (FIG. 1) may be configured to perform a loading operation 522 that loads respective first subsets of encoded values from second column vector 910 into registers 104a, 104b, and 104c. In some embodiments, registers 104a-104c are 256-bit registers, though only shown to have 8 bits for ease of explanation. Thus, in some embodiments, the first subset of values may comprise 256 values from second column vector 910, although only 8 are shown for ease of explanation. Second column vector 910 is shown to comprise 3-bit encoded values. Thus, the first subset of values may be loaded into a same number of registers as the number of bits in the encoded values, e.g., 3 in this example.

Block 1604 includes separating and reloading bits of the encoded values in the plurality of registers such that the $i^{th}$ bit of each encoded value is stored in the $i^{th}$ register of the plurality of registers. For example, processor 106 (FIG. 1) may be configured to perform a separating and reloading operation 1724 where a first bit of each encoded value (shown in bold in FIG. 16 for ease of reference only) may be separated and loaded into register 104a, a second bit of each encoded value may be separated and loaded into register 104b, and a third bit of each encoded value may be separated and loaded into register 104c, as partially indicated by the dotted circles and arrows. Although bits from encoded values of second column vector 910 may be separated and reloaded into the registers 104a-104c in any order, that order must be the same for each register 104a-104c.

Block 1606 includes, for at least some of the unique encoded values of the second column vector, comparing bits of each encoded value in the plurality of registers with corresponding bits of the unique encoded value.

Block 1608 includes, based on the comparison, setting a further bit for each encoded value having all bits matching the unique encoded value. For example, with reference to FIG. 17, processor 106 (FIG. 1) may be configured to perform an operation 1726 that compares the bit in each of registers 104a-104c for each encoded value with the corresponding bits of the unique encoded value and then, based on the comparison, generate a fourth vector having a corresponding bit set for each encoded value having all bits matching the unique encoded value. For example, for the unique encode value "000", processor 106 may be configured to generate bit vector 1712 utilizing the comparison function Z=NOT (A OR B OR C), where A, B and C are the respective $i^{th}$ bits in registers 104a, 104b, 104c for each bit in registers 104a, 104b, 104c. Similarly, for the unique encoded value "010", processor 106 may be configured to generate bit vector 1716 utilizing the comparison function Z=NOT (A OR B) AND C.

Block 1610 includes, for each further bit set, incrementing a fourth counter for the unique encoded value in a third array. For example, with reference to FIG. 17, processor 106 (FIG. 1) may be configured to perform an incrementing operation 1728 on each of total counters $C_0$, $C_1$ and $C_2$ by 2 based on each respective bit vector 1712, 1714, 1716 having two bits set.

Block 1612 includes determining a fifth counter value in the third array by subtracting fourth counters in the third array from a total number of rows of the second column vector, the fifth counter corresponding to a last of the unique encoded values in the second column vector. For example, with reference to FIG. 17, once all encoded values of second column vector 912 have been processed through block 1610, processor 106 (FIG. 1) may be configured to subtract total counts $C_0$, $C_1$ and $C_2$ from a total number of rows of second column vector 912 to determine total count $C_3$ corresponding to the final unique encoded value in second column vector 912.

The process described in connection with FIGS. 16 and 17 can also be applied to filters, where such filters are in the form of a bit vector similar to bit vectors 1712, 1714, 1716. For example, filter bit vectors may be ANDed with the separated and reloaded bits in registers 104a-104c shown after operation 1724 in FIG. 17. This may be equivalent to assigning all filtered rows to group zero, and this group can be skipped while updating counters as previously described in connection with block 1610. Thus, this group zero may be selected as the skipped group. The count for group zero, or filtered out rows, may be determined by subtracting the number of rows passing the filter (e.g., the number of bits set in the filter bit vector) from the total number of rows in second column vector 910.

The process described in connection with FIGS. 16 and 17 can also be applied to multiple grouping columns, so long as they all utilize bit packing with relatively small bit widths and the sum of all bit widths is also relatively small (e.g., 5 bits). For example, in such embodiments, query 250 (FIG. 2) may comprise an indication of a plurality of column vectors (e.g., two or more) having encoded values by which a result of query 250 is to be grouped. In such embodiments, a separate set of bit vectors (similar to bit vectors 1712, 1714, 1716) may be generated for each column vector by which query 250 indicates results are to be grouped. Then, blocks 1610 and 1612 may be carried out utilizing union of all sets of bit vectors for the plurality of grouping column vectors as if all bits came from a single column. Logically, this corresponds to concatenating bits of values from all grouping columns for the same row.

GroupID Maps

In some embodiments, queries may include one or more expressions that require repetitive evaluation in order to return a result. An example of such a query may be:

Select substr(1,3,s), count(*)
From t
Group by substr(1,3,s)

Such a query asks for substrings that span the first through third character of all entries in a column "s" of a table "t" and to group the results by unique substrings. Thus, in order to return a result, the expression "substr(1,3,s)" must be evaluated. Rather than evaluating the expression outright each time, a two-level dictionary may be employed that allows a lookup of a previously mapped evaluation for a particular expression. Where inputs to the expression are repetitive, such lookups can save considerable processing cycles compared with re-evaluating an expression each time it is encountered. For example, consider an example column s in Table 7 below and the result of evaluation of the expression "substr(1,3,s)" in Table 8.

As the expression "substr(1,3,s)" is evaluated for column "s" a first map or hash table may be generated such that each time a new input from column "s" is encountered, the input is mapped to an encoded value for that entry in a first table, as shown in Table 9 below. Likewise, each time an output of the expression is generated, the output is mapped to an encoded value for that output in a second table, as shown in Table 10. Similarly, the encoded values of the first table may then be further mapped to the encoded values of the second table, as shown in Table 11.

TABLE 7

| s |
|---|
| carton |
| carbon |
| battle |
| bridge |
| carton |
| battle |
| carton |
| bridge |

TABLE 8

| s |
|---|
| car |
| car |
| bat |
| bri |
| car |
| bat |
| car |
| bri |

TABLE 9

First Map

| Input Value | Encoded Input |
|---|---|
| carton | 00 |
| carbon | 01 |

TABLE 9-continued

First Map

| Input Value | Encoded Input |
|---|---|
| battle | 10 |
| bridge | 11 |

TABLE 10

Second Map

| Output Value | Encoded Output |
|---|---|
| car | 00 |
| bat | 01 |
| bri | 10 |

TABLE 11

Third Map

| Encoded Input | Encoded Output |
|---|---|
| 00 | 00 |
| 01 | 00 |
| 10 | 01 |
| 11 | 10 |

Accordingly, as each row of column "s" is evaluated, processor 106 (FIG. 1) may first determine whether the string appearing in column "s" has already been mapped to an encoded value in the first map. If so, rather than re-evaluating the expression "substr(1,3,s)", processor 106 may, instead, use the corresponding encoded value, e.g., "00", from the first map to look up the output value in the second map utilizing the mapped correspondence in the third map. In this way, by using this multilevel dictionary, expressions may be evaluated in far fewer CPU cycles than if the expressions were re-evaluated each time.

In yet other embodiments where results are grouped by multiple columns, hash tables for encoding of each of the multiple columns may be merged into a single hash table and utilized to group results, as though results were grouped by only a single column, according to any method discussed above. For example, recall Table 5 and assume the following query:

Select division, state,sum(sale_amt)
From table_of_sales
Group by division, state This query asks for the sum of sale_amt from the table table_of_sales and asks that the resulting sums be grouped by division and state, thus, requiring group by operations based on entries in both the "division" column and the "state" column.

Instead of evaluating the query by each group by column individually, according to some embodiments, the encoded values in corresponding rows of the "division" and "state" columns may be concatenated to form a single encoded column by which output results may be grouped, in accordance with any process previously described.

Accordingly, a hash table may be generated that maps each concatenated encoded entry to the decoded values for each encoded column value, as shown in Table 12 below. The key for the hash table of Table 12 has a number of bits that is the sum of the number of bits for the original encoded "division" and "state" columns, e.g., 1 bit+3 bits=4 bits. Accordingly, grouping by the concatenated column of encoded values allows the avoidance of multiple iterations through the group by process because the sorting or grouping operation operates on the concatenated column of encoded values, treating each concatenated encoded value as if it were a single encoded value. This drastically reducing the number of CPU cycles required to generate a result of the query.

TABLE 12

Map

| division/state | Decoded Division | Decoded State |
|---|---|---|
| 0000 | east | New York |
| 0001 | east | California |
| 0010 | east | Florida |
| 0011 | east | Washington |
| 0100 | east | Nevada |
| 1000 | west | New York |
| 1001 | west | California |
| 1010 | west | Florida |
| 1011 | west | Washington |
| 1100 | west | Nevada |

In interpreting the present application, it should be understood that the word "comprising" does not exclude the presence of other elements or acts than those listed and that the word "a" or "an" preceding an element does not exclude the presence of a plurality of such elements. Any reference signs do not limit the scope of the entities to which they refer. Several "means" may be represented by the same item or hardware or software implemented structure or function. Each of the disclosed elements may comprise a combination of hardware portions (e.g., including discrete and integrated electronic circuitry) and software portions (e.g., computer programming, instructions or code). Hardware portions may include one or more processors and/or memory, and software portions may be stored on a non-transitory, computer-readable medium, and may be configured to cause such one or more processors to perform some or all of the functions of one or more of the disclosed elements. Hardware portions may be comprised of one or both of analog and digital portions. Any of the disclosed devices or portions thereof may be combined together or separated into further portions unless specifically stated otherwise. No specific sequence of acts is intended to be required unless specifically indicated. The term "plurality of" an element includes two or more of the claimed element, and does not imply any particular range of number of elements; that is, a plurality of elements can be as few as two elements, and can include an immeasurable number of elements.

What is claimed is:

1. A method for causing a processor to perform a query on a column-store table comprising one or more column vectors of encoded values, the method comprising configuring the processor to:
   receive the query, the query comprising a filter to be applied to at least a first column vector of the encoded values, wherein the first column vector comprises a plurality of contiguous segments, each segment being encoded separately from segments of another column vector of the column-store table;
   process the query for a batch of the encoded values in a segment of the first column vector, whereby to generate a first vector indicative of respective encoded values passing the filter or failing the filter;

determine, from the first vector, a selectivity indicator of the filter for the encoded values in the batch indicating a proportion of encoded values passing the filter or a proportion of and encoded values failing the filter, relative to the encoded values in the first column vector;

determine a bit length of the first column vector which is used by all of the encoded values in the first column vector; and for the batch of the encoded values, select an algorithm from a plurality of algorithms for processing the query, the algorithm being selected based on the selectivity indicator for the batch and the determined bit length of all of the encoded values in the first column vector.

2. The method of claim 1, wherein the selected algorithm causes the processor to:

add bits to each of at least the subset of the encoded values in the first column vector thereby generating unpacked encoded values of the first column vector, each unpacked encoded value having a same length;

load a first subset of values into respective lanes of a first register, the first subset comprising the unpacked encoded values;

load a second subset of values into respective lanes of a second register, the second subset comprising values of the first vector that correspond to the first subset of values; and utilize a single instruction to output unpacked encoded values passing the filter from the first register into a filtered column vector based on the values in the second subset.

3. The method of claim 1, wherein the selected algorithm causes the processor to:

generate a second vector comprising a plurality of consecutive integer values;

load a first subset of values into respective lanes of a first register, the first subset comprising the consecutive integer values of the second vector;

load a second subset of values into respective lanes of a second register, the second subset comprising values of the first vector;

utilize a single instruction to output integer values from the first register into a third vector based on the values in the second subset;

match the integer values of the third vector with indices of the first column vector; and based on the match, retrieve and decode encoded values of the first column vector.

4. The method of claim 1, wherein the query further comprises an indication of a second column vector having encoded values by which a result of the query is to be grouped, the selected algorithm causing the processor to:

add bits to encoded values in the second column vector, thereby generating unpacked encoded values of the second column vector, each unpacked encoded value having a same length;

load a first subset of values into respective lanes of a first register, the first subset comprising the unpacked encoded values of the second column vector;

load a second subset of values into respective lanes of a second register, the second subset comprising values of the first vector that correspond to the first subset of values;

utilize a single instruction to update, to a constant value, unpacked encoded values in lanes of the first register that correspond to lanes of the second register that comprise an indication of failing the filter, thereby generating an updated second column vector; and execute the query on the column-store table utilizing the updated second column vector, thereby generating a result of the query, the result including results for all groups except the group corresponding to the constant value.

5. The method of claim 1, wherein the query further comprises an indication of a second column vector having encoded values by which a result of the query is to be grouped, the selected algorithm causing the processor to:

for each unique encoded value in the second column vector, determine a count of the unique encoded value in the second column vector;

generate a plurality of subarrays, each subarray being associated with a different unique encoded value in the second column vector and having a length based on the count corresponding to the unique encoded value;

for each row of the second column vector, insert an indication of the row into one of the plurality of subarrays based on the encoded value at the row;

concatenate each of the plurality of subarrays to generate a first array;

for one of the subarrays of the first array:
match the indications of the rows in the subarray with rows of the first column vector;
based on the match, retrieve and decode encoded values of the first column vector; and
load the decoded values of the first column vector into respective lanes of a first register;
utilize a single instruction to add the decoded values in each lane of the first register to a corresponding lane in a further register, thereby generating, in the corresponding lanes of the further register, sums of decoded values from corresponding lanes of the first register.

6. The method of claim 1, wherein the query further comprises an indication of a second column vector having encoded values by which a result of the query is to be grouped, the selected algorithm causing the processor to:

add bits to encoded values in the second column vector, thereby generating unpacked encoded values of the second column vector, each unpacked encoded value having a same length;

load each of a first subset of values into respective lanes of a first register, the first subset comprising the unpacked encoded values of the second column vector;

for each lane of the first register, initialize a first counter in a corresponding lane of each of a plurality of further registers, such that each of the plurality of further registers holds a respective first counter for each lane of the first register and all first counters in each further register correspond to a unique unpacked encoded value of the second column vector;

for each lane of the first register, increment the first counter in the corresponding lane of one of the plurality of further registers that corresponds to the unpacked encoded value in the lane of the first register;

for each of the plurality of further registers, sum first counters in the further register and add the sum to a corresponding second counter for the corresponding unique unpacked encoded value; and determine a third counter by subtracting the corresponding second counters from a total number of rows of the second column vector, the third counter value corresponding to a last of the unique unpacked encoded values in the second column vector.

7. The method of claim 1, wherein the query further comprises an indication of a plurality of column vectors having encoded values by which a result of the query is to be grouped, the selected algorithm causing the processor to:
for each column vector of the plurality of column vectors, load a first subset of encoded values of the column vector into respective lanes of a respective register, thereby forming a third array comprising the respective registers;
add bits to encoded values in each of the respective registers, thereby generating unpacked encoded values of the plurality of column vectors, each unpacked encoded value having a first length or a second length;
transpose the third array such that unpacked encoded values previously loaded into a single respective register are now loaded in corresponding lanes of the respective registers; and
for each respective register, utilizing a single instruction to add the unpacked encoded value in each lane of the respective register to a corresponding lane in a further register, thereby generating, in the corresponding lanes of the further register, sums of unpacked encoded values from corresponding lanes of each respective register.

8. The method of claim 1, wherein the query further comprises an indication of a second column vector having encoded values by which a result of the query is to be grouped, the selected algorithm causing the processor to:
load each of a first subset of values into a plurality of registers, the first subset comprising the encoded values of the second column vector;
separate and reload bits of the encoded values in the plurality of registers such that the $i^{th}$ bit of each encoded value is stored in the $i^{th}$ register of the plurality of registers;
for at least some of the unique encoded values of the second column vector:
compare bits of each encoded value in the plurality of registers with corresponding bits of the unique encoded value;
based on the comparison, set a further bit for each encoded value having all bits matching bits of the unique encoded value;
for each further bit set, increment a fourth counter for the unique encoded value in a third array; and
determine a fifth counter in the third array by subtracting fourth counters in the third array from a total number of rows of the second column vector, the fifth counter corresponding to a last of the unique encoded values in the second column vector.

9. A non-transitory, computer readable medium comprising code that, when executed, causes a processor to:
perform a query on a column-store table comprising one or more column vectors of encoded values;
receive the query, the query comprising a filter to be applied to at least a first column vector of the encoded values, wherein the first column vector comprises a plurality of contiguous segments, each segment being encoded separately from segments of another column vector of the column-store table;
process the query for a batch of the encoded values in a segment in the first column vector, whereby to generate a first vector indicative of respective encoded values passing the filter or failing the filter;
determine, from the first vector, a selectivity indicator of the filter for the encoded values in the batch indicating a proportion of encoded values passing the filter or a proportion of encoded values failing the filter, relative to the encoded values in the first column vector;
determine a bit length of the first column which is used by all of the encoded values in the first column vector; and
for the batch of the encoded values, select an algorithm from a plurality of algorithms for processing the query, the algorithm being selected based on the selectivity indicator for the batch and the determined bit length of all of the encoded values in the first column vector.

10. The non-transitory, computer-readable medium of claim 9, wherein the selected algorithm causes the processor to:
add bits to each of at least the subset of the encoded values in the first column vector thereby generating unpacked encoded values of the first column vector, each unpacked encoded value having a same length;
load a first subset of values into respective lanes of a first register, the first subset comprising the unpacked encoded values;
load a second subset of values into respective lanes of a second register, the second subset comprising values of the first vector that correspond to the first subset of values; and
utilize a single instruction to output unpacked encoded values passing the filter from the first register into a filtered column vector based on the values in the second subset.

11. The non-transitory, computer-readable medium of claim 9, wherein the selected algorithm causes the processor to:
generate a second vector comprising a plurality of consecutive integer values;
load a first subset of values into respective lanes of a first register, the first subset comprising the consecutive integer values of the second vector;
load a second subset of values into respective lanes of a second register, the second subset comprising values of the first vector;
utilize a single instruction to output integer values from the first register into a third vector based on the values in the second subset;
match the integer values of the third vector with indices of the first column vector; and
based on the match, retrieve and decode encoded values of the first column vector.

12. The non-transitory, computer-readable medium of claim 9, wherein the query further comprises an indication of a second column vector having encoded values by which a result of the query is to be grouped, the selected algorithm causing the processor to:
add bits to encoded values in the second column vector, thereby generating unpacked encoded values of the second column vector, each unpacked encoded value having a same length;
load a first subset of values into respective lanes of a first register, the first subset comprising the unpacked encoded values of the second column vector;
load a second subset of values into respective lanes of a second register, the second subset comprising values of the first vector that correspond to the first subset of values;
utilize a single instruction to update, to a constant value, unpacked encoded values in lanes of the first register that correspond to lanes of the second register that comprise an indication of failing the filter, thereby generating an updated second column vector; and execute the query on the column-store table utilizing the updated second column vector, thereby generating a result of the query, the result including results for all groups except the group corresponding to the constant value.

13. The non-transitory, computer-readable medium of claim 9, wherein the query further comprises an indication of a second column vector having encoded values by which a result of the query is to be grouped, the selected algorithm causing the processor to:

for each unique encoded value in the second column vector, determine a count of the unique encoded value in the second column vector;

generate a plurality of subarrays, each subarray being associated with a different unique encoded value in the second column vector and having a length based on the count corresponding to the unique encoded value;

for each row of the second column vector, insert an indication of the row into one of the plurality of subarrays based on the encoded value at the row;

concatenate each of the plurality of subarrays to generate a first array;

for one of the subarrays of the first array:
match the indications of the rows in the subarray with rows of the first column vector;
based on the match, retrieve and decode encoded values of the first column vector; and
load the decoded values of the first column vector into respective lanes of a first register;
utilize a single instruction to add the decoded values in each lane of the first register to a corresponding lane in a further register, thereby generating, in the corresponding lanes of the further register, sums of decoded values from corresponding lanes of the first register.

14. The non-transitory, computer-readable medium of claim 9, wherein the query further comprises an indication of a second column vector having encoded values by which a result of the query is to be grouped, the selected algorithm causing the processor to:

add bits to encoded values in the second column vector, thereby generating unpacked encoded values of the second column vector, each unpacked encoded value having a same length;

load each of a first subset of values into respective lanes of a first register, the first subset comprising the unpacked encoded values of the second column vector;

for each lane of the first register, initialize a first counter in a corresponding lane of each of a plurality of further registers, such that each of the plurality of further registers holds a respective first counter for each lane of the first register and all first counters in each further register correspond to a unique unpacked encoded value of the second column vector;

for each lane of the first register, increment the first counter in the corresponding lane of one of the plurality of further registers that corresponds to the unpacked encoded value in the lane of the first register;

for each of the plurality of further registers, sum first counters in the further register and add the sum to a corresponding second counter for the corresponding unique unpacked encoded value; and determine a third counter by subtracting the corresponding second counters from a total number of rows of the second column vector, the third counter value corresponding to a last of the unique unpacked encoded values in the second column vector.

15. The non-transitory, computer-readable medium of claim 9, wherein the query further comprises an indication of a plurality of column vectors having encoded values by which a result of the query is to be grouped, the selected algorithm causing the processor to:

for each column vector of the plurality of column vectors, load a first subset of encoded values of the column vector into respective lanes of a respective register, thereby forming a third array comprising the respective registers;

add bits to encoded values in each of the respective registers, thereby generating unpacked encoded values of the plurality of column vectors, each unpacked encoded value having a first length or a second length;

transpose the third array such that unpacked encoded values previously loaded into a single respective register are now loaded in corresponding lanes of the respective registers; and for each respective register, utilizing a single instruction to add the unpacked encoded value in each lane of the respective register to a corresponding lane in a further register, thereby generating, in the corresponding lanes of the further register, sums of unpacked encoded values from corresponding lanes of each respective register.

16. The non-transitory, computer-readable medium of claim 9, wherein the query further comprises an indication of a second column vector having encoded values by which a result of the query is to be grouped, the selected algorithm causing the processor to:

load each of a first subset of values into a plurality of registers, the first subset comprising the encoded values of the second column vector;

separate and reload bits of the encoded values in the plurality of registers such that the $i^{th}$ bit of each encoded value is stored in the $i^{th}$ register of the plurality of registers;

for at least some of the unique encoded values of the second column vector:
compare bits of each encoded value in the plurality of registers with corresponding bits of the unique encoded value;
based on the comparison, set a further bit for each encoded value having all bits matching bits of the unique encoded value;
for each further bit set, increment a fourth counter for the unique encoded value in a third array; and determine a fifth counter in the third array by subtracting fourth counters in the third array from a total number of rows of the second column vector, the fifth counter corresponding to a last of the unique encoded values in the second column vector.

17. A system configured to perform a query on a column-store table comprising one or more column vectors of encoded values, the system comprising:

at least one register configured to hold one or more values;

at least one processor;

and a computer readable medium comprising code that, when executed, causes the processor to:
receive the query, the query comprising a filter to be applied to at least a first column vector of the encoded values, wherein the first column vector comprises a plurality of contiguous segments, each segment being encoded separately from segments of another column vector of the column-store table;

process the query for a batch of the encoded values in a segment in the first column vector, whereby to generate a first vector indicative of respective encoded values passing the filter or failing the filter;

determine, from the first vector, a selectivity indicator of the filter for the encoded values in the batch indicating a proportion of encoded values passing the filter or a proportion of encoded values failing the filter, relative to the encoded values in the first column vector;

determine a bit length of the first column vector which is used by all of the encoded values in the first column vector; and for the batch of the encoded values, select an algorithm from a plurality of algorithms for processing the query, the algorithm being selected based on the selectivity indicator for the batch and the determined bit length of all of the encoded values in the first column vector.

18. The system of claim 17, wherein the at least one register comprises a first register and a second register, the selected algorithm causing the processor to:

add bits to each of at least the subset of the encoded values in the first column vector thereby generating unpacked encoded values of the first column vector, each unpacked encoded value having a same length;

load a first subset of values into respective lanes of the first register, the first subset comprising the unpacked encoded values;

load a second subset of values into respective lanes of the second register, the second subset comprising values of the first vector that correspond to the first subset of values; and utilize a single instruction to output unpacked encoded values passing the filter from the first register into a filtered column vector based on the values in the second subset.

19. The system of claim 17, wherein the at least one register comprises a first register and a second register, the selected algorithm causing the processor to:

generate a second vector comprising a plurality of consecutive integer values;

load a first subset of values into respective lanes of a first register, the first subset comprising the consecutive integer values of the second vector;

load a second subset of values into respective lanes of a second register, the second subset comprising values of the first vector;

utilize a single instruction to output integer values from the first register into a third vector based on the values in the second subset;

match the integer values of the third vector with indices of the first column vector; and based on the match, retrieve and decode encoded values of the first column vector.

20. The system of claim 17, wherein the at least one register comprises a first register and a second register, and the query further comprises an indication of a second column vector having encoded values by which a result of the query is to be grouped, the selected algorithm causing the processor to:

add bits to encoded values in the second column vector, thereby generating unpacked encoded values of the second column vector, each unpacked encoded value having a same length;

load a first subset of values into respective lanes of a first register, the first subset comprising the unpacked encoded values of the second column vector;

load a second subset of values into respective lanes of a second register, the second subset comprising values of the first vector that correspond to the first subset of values;

utilize a single instruction to update, to a constant value, unpacked encoded values in lanes of the first register that correspond to lanes of the second register that comprise an indication of failing the filter, thereby generating an updated second column vector; and execute the query on the column-store table utilizing the updated second column vector, thereby generating a result of the query, the result including results for all groups except the group corresponding to the constant value.

21. The system of claim 17, wherein the at least one register comprises a first register and a further register, and the query further comprises an indication of a second column vector having encoded values by which a result of the query is to be grouped, the selected algorithm causing the processor to:

for each unique encoded value in the second column vector, determine a count of the unique encoded value in the second column vector;

generate a plurality of subarrays, each subarray being associated with a different unique encoded value in the second column vector and having a length based on the count corresponding to the unique encoded value;

for each row of the second column vector, insert an indication of the row into one of the plurality of subarrays based on the encoded value at the row;

concatenate each of the plurality of subarrays to generate a first array;

for one of the subarrays of the first array:
match the indications of the rows in the subarray with rows of the first column vector;
based on the match, retrieve and decode encoded values of the first column vector; and
load the decoded values of the first column vector into respective lanes of the first register;
utilize a single instruction to add the decoded values in each lane of the first register to a corresponding lane in the further register, thereby generating, in the corresponding lanes of the further register, sums of decoded values from corresponding lanes of the first register.

22. The system of claim 17, wherein the at least one register comprises a first register and a plurality of further registers, and the query further comprises an indication of a second column vector having encoded values by which a result of the query is to be grouped, the selected algorithm causing the processor to:

add bits to encoded values in the second column vector, thereby generating unpacked encoded values of the second column vector, each unpacked encoded value having a same length;

load each of a first subset of values into respective lanes of a first register, the first subset comprising the unpacked encoded values of the second column vector;

for each lane of the first register, initialize a first counter in a corresponding lane of each of the plurality of further registers, such that each of the plurality of further registers holds a respective first counter for each lane of the first register and all first counters in each further register correspond to a unique unpacked encoded value of the second column vector;

for each lane of the first register, increment the first counter in the corresponding lane of one of the plurality of further registers that corresponds to the unpacked encoded value in the lane of the first register;

for each of the plurality of further registers, sum first counters in the further register and add the sum to a corresponding second counter for the corresponding unique unpacked encoded value; and determine a third counter by subtracting the corresponding second counters from a total number of rows of the second column vector, the third counter value corresponding to a last of the unique unpacked encoded values in the second column vector.

23. The system of claim 17, wherein the at least one register comprises a plurality of respective registers and a further register, and the query further comprises an indication of a second column vector having encoded values by which a result of the query is to be grouped, the selected algorithm causing the processor to:

for each column vector of the plurality of column vectors, load a first subset of encoded values of the column vector into respective lanes of a respective register, thereby forming a third array comprising the respective registers;

add bits to encoded values in each of the respective registers, thereby generating unpacked encoded values of the plurality of column vectors, each unpacked encoded value having a first length or a second length;

transpose the third array such that unpacked encoded values previously loaded into a single respective register are now loaded in corresponding lanes of the respective registers; and for each respective register, utilizing a single instruction to add the unpacked encoded value in each lane of the respective register to a corresponding lane in the further register, thereby generating, in the corresponding lanes of the further register, sums of unpacked encoded values from corresponding lanes of each respective register.

24. The system of claim 17, wherein the at least one register comprises a plurality of registers, and the query further comprises an indication of a second column vector having encoded values by which a result of the query is to be grouped, the selected algorithm causing the processor to:

load each of a first subset of values into a plurality of registers, the first subset comprising the encoded values of the second column vector;

separate and reload bits of the encoded values in the plurality of registers such that the $i^{th}$ bit of each encoded value is stored in the $i^{th}$ register of the plurality of registers;

for at least some of the unique encoded values of the second column vector:

compare bits of each encoded value in the plurality of registers with corresponding bits of the unique encoded value;

based on the comparison, set a further bit for each encoded value having all bits matching bits of the unique encoded value;

for each further bit set, increment a fourth counter for the unique encoded value in a third array; and determine a fifth counter in the third array by subtracting fourth counters in the third array from a total number of rows of the second column vector, the fifth counter corresponding to a last of the unique encoded values in the second column vector.

\* \* \* \* \*